Nov. 7, 1967  G. F. MOORE ET AL  3,351,453
PROCESS OF MANUFACTURING IN A ROTATING SOLID BED SUBSTANTIALLY
DRY, SOLID FERTILIZER CONTAINING GRANULATED AMMONIUM PHOSPHATE
Filed Oct. 20, 1960  6 Sheets-Sheet 4

ROUNDED
GRANULE OF
DI-AMMONIUM
PHOSPHATE

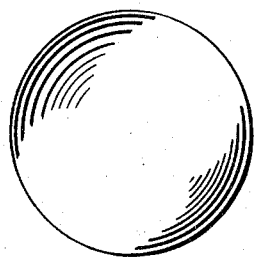

FREELY
FLOWING
ROLLABLE AND
SLIDEABLE

FIG. 4

NON CLOGGING
NON CAKING
NON STICKING

ROUNDED
GRANULAR
PHOSPHATE
PARTICLES
RANGING FROM
ABOUT 6 MESH
TO ABOUT
16 MESH

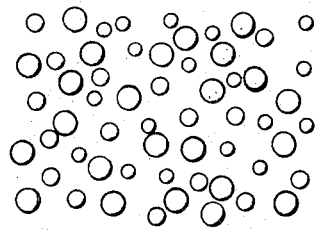

SPHERICAL
PARTICLES OF
DI-AMMONIUM
PHOSPHATE
HAVING
DIAMETERS OF
ABOUT 0.131" TO
ABOUT 0.039"

FIG. 5

PILE OF
ROUNDED GRANULES OF
DI-AMMONIUM PHOSPHATE
HAVING AN ANGLE OF
REPOSE OF ABOUT
30° TO 35°

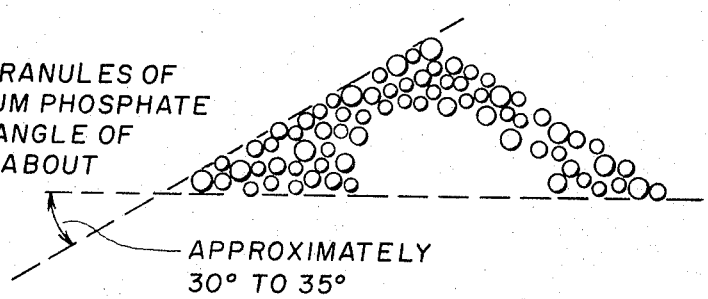

APPROXIMATELY
30° TO 35°

FIG. 6

INVENTORS
GEORGE F. MOORE
THOMAS BEER

INVENTORS
GEORGE F. MOORE
THOMAS BEER

United States Patent Office

3,351,453
Patented Nov. 7, 1967

3,351,453
PROCESS OF MANUFACTURING IN A ROTATING SOLID BED SUBSTANTIALLY DRY, SOLID FERTILIZER CONTAINING GRANULATED AMMONIUM PHOSPHATE
George F. Moore and Thomas Beer, Tampa, Fla., assignors, by mesne assignments, to Tennessee Corporation, New York, N.Y., a corporation of Delaware
Filed Oct. 20, 1960, Ser. No. 63,876
8 Claims. (Cl. 71—34)

The present application is a continuation-in-part of applicants' co-pending application Ser. No. 691,961, filed Oct. 23, 1957, now U.S. Patent No. 2,963,359, which in turn is a continuation-in-part of applicants' co-pending application Ser. No. 600,235, filed July 26, 1956, now abandoned.

The present invention relates to an improved process of manufacturing in a rotating solid bed substantially dry, solid fertilizer containing granulated ammonium phosphate having a rounded form and analyzing approximately 12% to approximately 21% nitrogen and approximately 40% to approximately 60% of $P_2O_5$ and having a ratio of nitrogen to $P_2O_5$ of approximately one to four and one-half to approximately one to two and one-half, and, more particularly, to an improved process of directly producing in a rotating solid bed substantially dry, solid fertilizer containing a rounded granulated di-ammonium phosphate and analyzing approximately 15% to 21% of nitrogen and approximately 45% to 52% of $P_2O_5$ and having a ratio of nitrogen to $P_2O_5$ of approximately one to three and one-third to approximately one to two and one-half.

It has now been discovered that an improved fertilizer containing granulated ammonium phosphate can be manufactured by using an improved wet process employing a rotating mass of granular ammonium phosphate constituting a solid bed in which small, controlled amounts of liquid phosphoric acid can be neutralized by ammonia in excess of stoichiometric proportions. As a result of experiments, practical tests and actual manufacturing operations, it has been found preferable to use phosphoric acid which has been partially neutralized in a separate piece of equipment subject to control. The phosphate or phosphatic material constituting the rotating mass or solid bed may be mono-ammonium phosphate or di-ammonium phosphate or various mixtures thereof. In other words, the phosphatic material may be an ammonium phosphate or ammonium phosphates.

It is an object of the present invention to provide an improved direct process of manufacturing phosphatic fertilizer containing granular ammonium phosphate in a relatively simple and economical manner and in a solid and substantially dry state.

Another object of the invention is to provide an improved direct process of manufacturing a variety of commercially acceptable grades of ammonium phosphate involving wet operations and free from complicated equipment and difficult operations including the filtration, etc.

The invention also contemplates providing an improved direct process of manufacturing granular di-ammonium phosphate and other grades of ammonium phosphate in a rotating mass constituting a solid bed in which small, controlled amounts of phosphoric acid flowing over said granular di-ammonium phosphate or other grades of ammonium phosphate can be neutralized by anhydrous ammonia supplied in amounts in excess of stoichiometric proportions and enveloping the granular di-ammonium phosphate or other grades of ammonium phosphate in the solid bed.

It is a further object of the invention to provide an improved direct process of manufacturing ammonium phosphate in a rotating solid bed containing granular ammonium phosphate onto which liquid phosphoric acid is sprayed and into which excessive amounts of anhydrous ammonia is diffused.

The invention further contemplates providing an improved direct process of manufacturing granular di-ammonium phosphate fertilizer in a rotating solid bed of particles thereof providing sufficient carrier and supply surface for small, controlled amounts of liquid phosphoric acid to react with excessive amounts of anhydrous ammonia enveloping the granular di-ammonium phosphate in the solid bed and furnishing the proper nuclei for granulation.

Other objects and advantages will become apparent from the following description taken in conjunction with the accompanying drawing, in which:

FIG. 4 is an enlarged view of a rounded granule of di-ammonium phosphate made by the present invention;

FIG. 5 shows a number of granules of the type illustrated in FIG. 4 except on a smaller scale;

FIG. 6 is a pile of rounded granules to show the angle of repose thereof;

Figure 1:
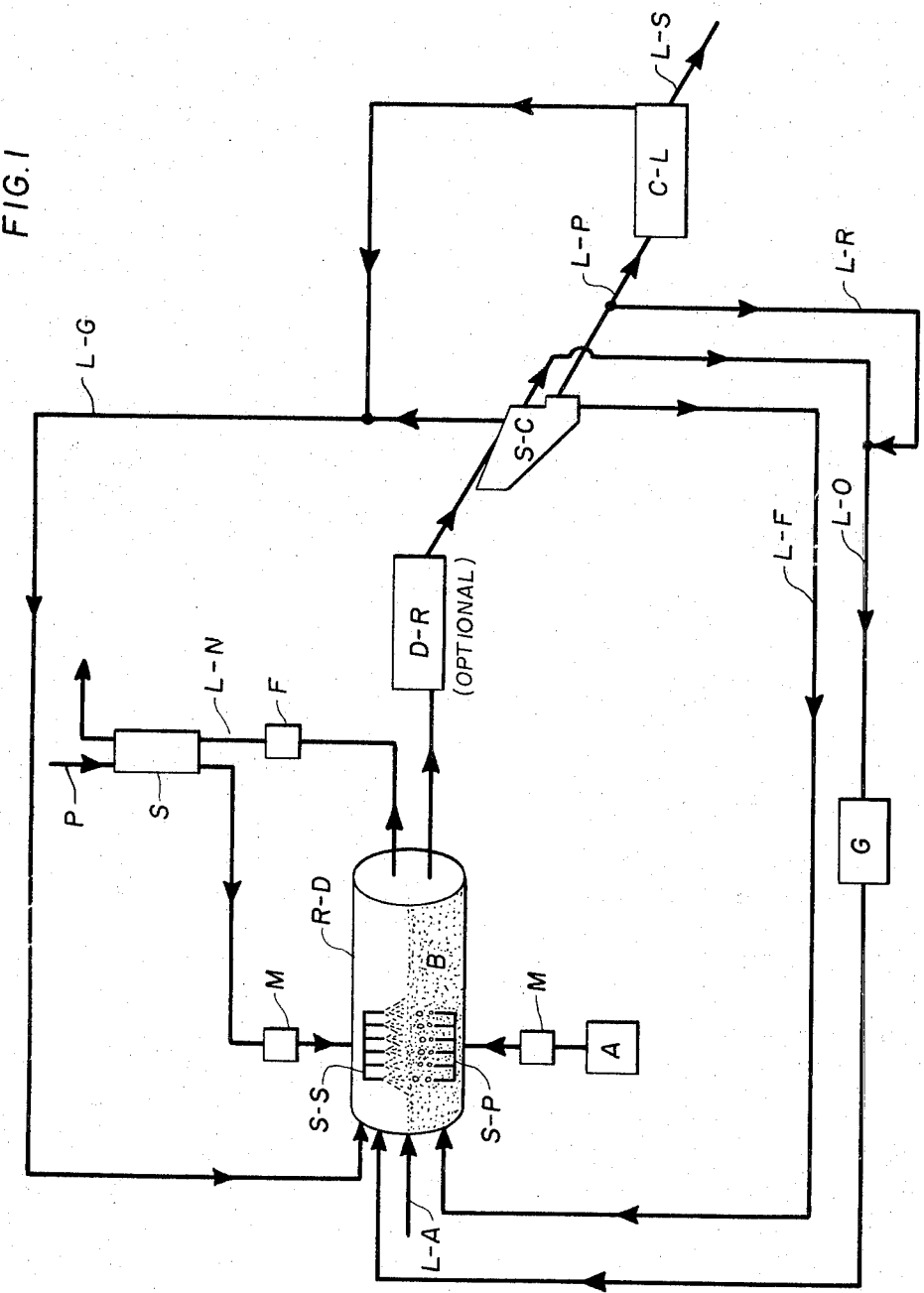
FIG. 1 illustrates a schematic view of an arrangement of equipment capable of carrying the invention into practice.

Generally speaking, the present invention contemplates the provision of a solid bed of granular ammonium phosphate having a sufficient thickness and ground to an appropriate fineness to furnish sufficient carrier and supply surface for the liquid phosphoric acid flowing over the surface and filming the same and to furnish the proper nuclei for granulation. As a general practice, the bed, for instance, in a rotating drum, should preferably have a depth of not less than about six inches and preferably not more than about forty-eight inches. However, the diameter and length of the drum might influence the depth to a certain extent. With the aforesaid bed a small, controlled amount of liquid phosphoric acid can be sprayed over the mass of fertilizer particles containing granular ammonium phosphate to cover the surfaces thereof preferably with a thin liquid film and excessive amounts of anhydrous ammonia can be introduced at the bottom of the solid bed whereby neutralization of liquid films or surfaces of phosphoric acid with ammonia occurs within the solid bed and directly on the surface of the granular ammonium phosphate and loss of ammonia is prevented. Of course, the phosphoric acid or partially neutralized phosphoric acid or mixtures thereof can be introduced by means of a distributor under pressure directly into the granular mass in the solid bed but spraying is preferred as it is more effective in distributing the liquid phosphoric acid and covering the surfaces of the granules more uniformly.

When other types of equipment are used, other depths are employed. For example, when a blunger is used, a depth of about 24 inches to about 36 inches would be appropriate. The depth should be substantial and sufficient to permit the vaporized ammonia to react with the phosphoric acid to produce ammonium phosphate. In some instances, greater depths can be used and under certain circumstances, depths up to about 48 inches can be used.

In carrying the invention into practice, it is preferred to use, for example, a rotating drum of such type as conventionally used for mixing and granulating complete fertilizers. It is to be understood, however, that other types of equipment can be used, such as a blunger referred to hereinafter. A bed of di-ammonium phosphate of say, for instance, about 1,500 pounds is provided in the bottom of the rotating drum. Satisfactory results have been obtained with a bed having a depth of about six or seven inches to about twelve or eighteen inches. The particles of granular phosphate constituting the solid, rotating bed are properly sized or ground to suitable fineness to furnish sufficient carrier and supply surface area for the liquid phosphoric acid and to furnish proper nuclei for granulation. Generally stated, the solid mass of granular di-ammonium phosphate should preferably be composed of the following sizes:

| Size (mesh) | Percentage |
| --- | --- |
| −10 to +14 | 5–15 |
| −14 to +32 | 20–40 |
| −32 to +60 | 20–40 |
| −60 | 10–50 |

The foregoing sizes are based on U.S. Standard Sieves. Data obtained from tests have demonstrated that with recycle material containing about 2% of moisture, the bulk of recycled material should be small granules having a size of about −14 mesh to +20 mesh. Generally speaking, there should be a minimum of fines and coarses. By fines is meant particles finer or smaller than about minus 20 or finer mesh and by coarses is meant particles having sizes in excess of about 8 mesh or coarser mesh.

While the drum is rotated, liquid phosphoric acid or partially neutralized phosphoric acid or a mixture thereof is sprayed on top of the solid bed containing granules at a rate of say, for instance, about 560 pounds of 42% ($P_2O_5$) variety per minute and anhydrous liquid ammonia is introduced at the bottom of the bed at a rate of say, for instance, about 110 pounds per minute. Instead of anhydrous liquid ammonia, anhydrous ammonia gas can be used. The supply of phosphoric acid and ammonia is controlled and metered in proportions to give the desired grade of di-ammonium phosphate, say, for instance, 18–47–0 (N-$P_2O_5$).

For satisfactory results, the amount of di-ammonium phosphate recirculated as a bed for the carrier of phosphoric acid should be approximately three times product made. In other words, if 100 or 1000 parts by weight of granular phosphate is the amount of product being made and discharged from the process, then 300 or 3000 parts by weight of granular phosphate is recirculated. However, the quantity of material for recirculation can be varied to suit the concentration of $P_2O_5$ in the phosphoric acid. In this operation, it is important to control the amount of moisture. The concentration of phosphoric acid can be varied, for example, from about 35% $P_2O_5$ up to about 50% $P_2O_5$ by varying the quantity of recirculation. Of course, operations may be conducted at lower or higher concentrations of phosphoric acid, but the foregoing concentrations are preferred for industrial operations. With about three times a recirculation load of product made, the concentration of phosphoric acid should preferably be about 40% to 43% of $P_2O_5$ to produce an 18–47–0 product. For best results, moisture ranges of about 1% to 8% are used, although a wider range may be employed.

Too much moisture, however, induces caking and agglomeration. Granulation of the product is accomplished by film build-up of the nuclei with freshly made product. Sufficient moisture must be maintained for the chemical reaction and to help shape the particles during rotation. Chemical control is maintained by a pH examination of product discharge from the rotating drum. Usually the pH should be controlled within a range of more than about 7.0 to less than about 8.0 and preferably within a range of about 7.4 to about 7.8 and particularly about 7.6 to about 7.8 for the production of the 18–47–0 product. Lower pH values apply to lower (N to $P_2O_5$) ratios. A suitable pH meter or pH colorimeter can be used and a control of about plus or minus 0.20 pH is recommended.

It has been found as a result of testing in actual operations that grade and pH can be more efficiently controlled by another test. In order to get the phosphoric acid to take up its full charge of ammonia and obtain a desired grade di-ammonium phosphate, say 18–47–0 (N-$P_2O_5$), the bed is charged with an excess of ammonia. Since the excess is large, say approximately 15% or more, the loss of unreacted ammonia to open air cannot be economically sustained and a recovery system for the unreacted ammonia is necessary. The ammonia control is maintained by conducting simple titration tests on the recirculating scrubbing phosphoric acid. These tests are conducted by titrating samples with alkali, such as sodium hydroxide, to the end-point of methyl purple and taking a burette reading; adding phenolphthalein, titrating to end-point thereof and taking a total burette reading. The first reading divided into the total reading gives a ratio. When the ratio of about 2.80 is maintained, the ratio of nitrogen to $P_2O_5$ in the product will be correct. In other words, the grade will be preferably maintained close to about 18–47–0 or so (N-$P_2O_5$). If the ratio goes above 2.80, too much ammonia or not enough acid is being added; if the ratio goes under 2.80, not enough ammonia is being added or too much phosphoric acid is being used. Since ammonia or nitrogen is being fed to the reactor from two sources, this last test is necessary. Since the reactor is only about 85% efficient in absorbing the free ammonia being fed, about 15% of the ammonia gas introduced is unreacted and is recovered in the ammonia recovery system by recirculated phosphoric acid, of which, a portion is continuously being fed to the reactor. Finally, an equilibrium is reached whereby approximately 85% of the ammonia introduced is absorbed by the phosphoric acid in the bed of the reactor and approximately 15% of the ammonia introduced is unreacted in the bed and is absorbed in the ammonia recovery system by recirculated phosphoric acid which is later used in the reactor.

The rotating drum is unique because it functions as a neutralization vessel, mixer, granulator and partial or complete dryer. While the drum is rotating, anhydrous ammonia is introduced at the bottom of the bed and phosphoric acid or partially neutralized phosphoric acid or a mixture thereof is simultaneously sprayed preferably on the top of the bed. Phosphoric acid covers the exposed surfaces and films of product are produced and grow on the nuclei particles containing granular di-ammonium phosphate or other grades of ammonium phosphate. The heat of neutralization drives off water as steam at about 212° F. Condensation of this steam in the drum is prevented by introducing some air, either hot or cold, through the top of the drum with the use of a suction fan which pulls it through and above the solid, rotating bed. Results of actual operations demonstrate that when hot air is introduced through the reactor and properly controlled, the reactor serves as a complete dryer. The temperature of the gases leaving the reactor is controlled at about 170° F. At this temperature, the air necessary to carry the water vapor away is reduced to about one-half of the air required if the air is not heated. The exit gases from the reactor could be maintained somewhat higher but if the temperature in the reactor gets too high, the reaction will not proceed all the way to di-ammonium phosphate.

The use of hot air through the reactor eliminates the dryer, reduces the size of the reactor, cyclone dust catcher for the reactor, the ammonia recovery system and the fan as all these pieces of equipment sizes are dependent on the volume of gases to be handled. The amount of air to be used depends not only upon the amount of water to be evaporated but also the temperature of the air leaving the reactor. For instance, one cubic foot of air at 120° F. will hold 4.9 grains of water whereas one cubic foot of air at 170° F. will hold 112.8 grains of water in the form of vapor. Illustrative amounts of air to be used are disclosed in the examples fully set forth hereinafter. Those skilled in the art can determine the amount of air required in any particular situation and can adjust the amount going to the reactor. For instance, in carrying the invention into practice on a pilot plant scale, about 10 pounds of air per pound of product were used. However, when an embodiment of the invention was conducted on an industrial scale with an exit gas temperature from the reactor of about 175° F., approximately 1.44 pounds of air per pound of product were employed. In the latter case, a theoretical minimum amount of about 0.84 pound of dry air per pound of product is the least amount which is theoretically required.

By using hot air, a dry free-flowing bed is assured in the reactor. This facilitates good agitation and mixing and eliminates caking and reduces build-up on the sides of the reactor to a minimum. The hot air likewise assures a more uniform granular product containing di-ammonium phosphate. It will thus be observed that the rotating drum performs several functions whereas in prior art processes, additional equipment or larger equipment was needed to perform each of the various functions, frequently including extra dissolving, filtering and crystallization operations.

Neutralization in the present process is effected in a moving bed of solid material acting as a carrier of phosphoric acid while at the same time granulation and mixing are accomplished as well as partial drying. Complete drying can be effected provided hot air is passed through the reactor. It can readily be understood by those skilled in the art that potash salts can be introduced which would give a complete fertilizer and that nitrate solutions high in nitrogen but low in water content or a combination of nitrogen solution and anhydrous ammonia could be introduced to raise the nitrogen content. Mixtures of phosphoric acid and sulfuric acid could likewise be used.

The present invention can be carried into practice with suitable equipment but a satisfactory arrangement is illustrated in FIG. 1 of the drawing. The reference character P designates a supply of liquid phosphoric acid. Such acid is preferably used in scrubber S which is preferably a spray tower with a mist trap to absorb ammonia by a current of air coming from rotating drum or reactor granulator R–D via line L–N. By absorbing ammonia, the phosphoric acid is partially neutralized. The current of air is supplied to drum R–D via line L–A. To induce the current of air through drum R–D, a fan F is provided at the discharge end of the drum.

Partially neutralized phosphoric acid coming from scrubber S goes to meter M and thence to the drum R–D via a distribution or spray system S–S while anhydrous liquid ammonia supply is designated by reference character A and is conveyed to meter M and thence to sparger S–P for distribution at the bottom or lower portion of a bed of ammonium phosphate B. Of course, the partially neutralized phosphoric acid can be supplemented with phosphoric acid. As a general rule, stoichiometric proportions of acid and ammonia are metered to rotating drum R–D which acts as a reactor-granulator or reaction vessel. It is preferred, however, to use an excess of ammonia and to recover the excess from the reactor and from the screens and cooler as explained hereinafter.

Neutralization occurs in the films of acid on the surface of ammonium phosphate particles.

From the rotating drum, the final product is discharged and may optionally go to dryer D–R. The dryer is needed only if the acid used is sufficiently dilute to cause too wet a final product. Such a product has a moisture content above, say, about 3.00%. The product leaving the rotating drum or dryer, if one is used, goes to a set of screens S–C. After screening, the finished product is discharged via line L–P. Part of the discharged product is recirculated via line L–R. The balance of the product is fed to the cooler C–L where the temperature is reduced to a temperature of about 100° F. to about 125° F., say 120° F. The cooler discharges the finished product via line L–S. It has been found that the cooling has very beneficial effects. Among these may be mentioned the elimination of deleterious effects on the materials of the bags or containers. Likewise, major handling problems with hot material are eliminated. Any tendency of hot particles to stick together, cake, set-up, etc., especially under pressure in handling and/or storage is also eliminated.

Oversize product is taken off via line L–O and goes to grinding mill G for grinding to appropriate sizes. Fines are returned via line L–F. The ground oversize, fines and the make-up from screened product are all returned to bed B in reactor granulator or drum R–D for further treatment.

The gases liberated in the cooler C–L and screens S–C contain much of the excess of the ammonia which was adsorbed in the product discharging from the reactor. This ammonia is recovered by conducting these gases through ducts L–G back to the reactor by any suitable means, such as a fan, etc.

Figure 2:
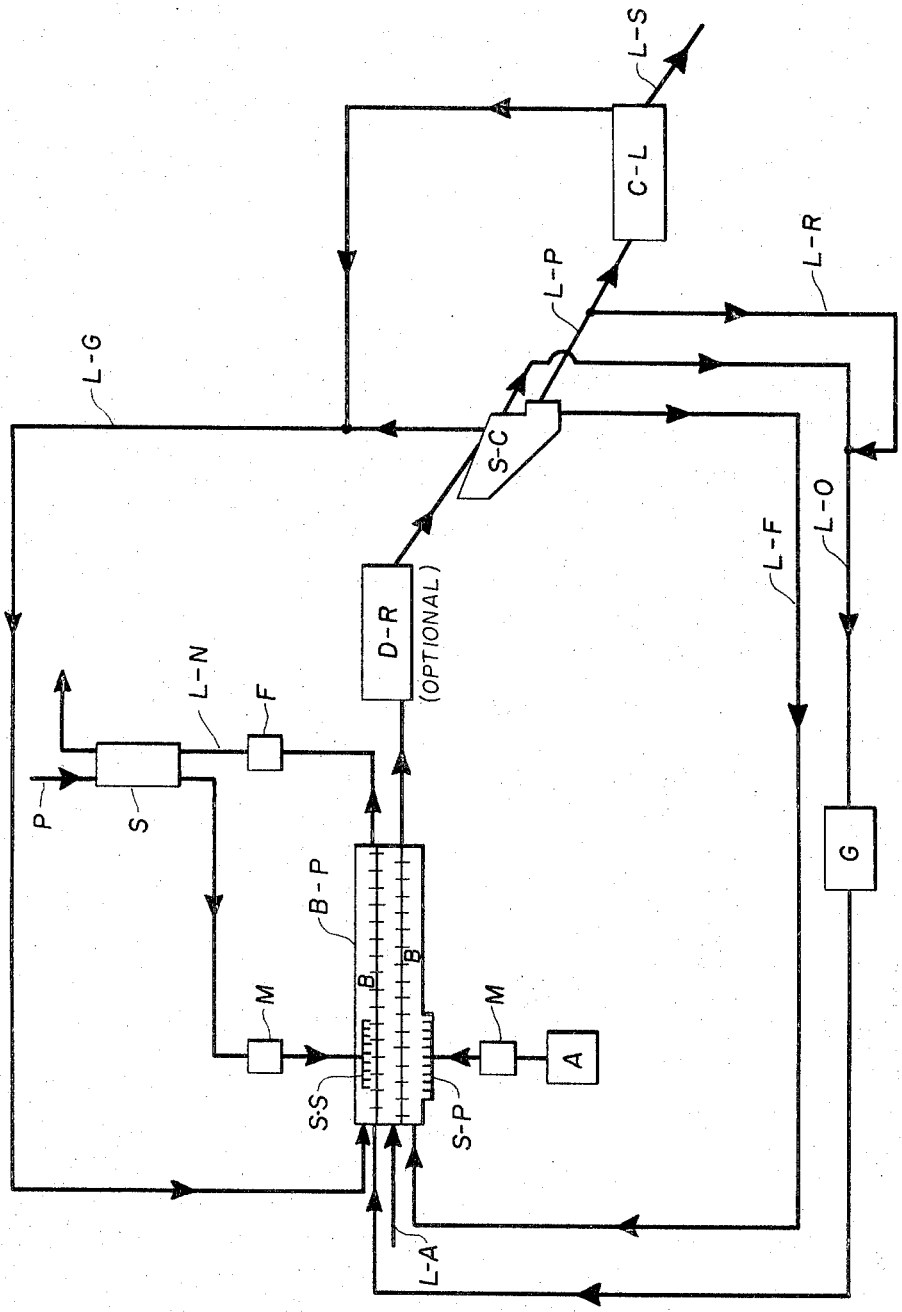
FIG. 2 is similar to FIG. 1 except that it shows the use of a blunger instead of a rotary drum.

Another satisfactory arrangement of suitable equipment is illustrated in FIG. 2 of the drawing. Generally speaking, this arrangement is similar to that shown in FIG. 1. The reference character P designates a supply of liquid phosphoric acid. Such acid is preferably used in scrubber S which is preferably a spray tower with a mist trap to absorb ammonia carried by a current of air coming from the blunger B–P via line L–N. By absorbing ammonia, the phosphoric acid is partially neutralized. The current of air is supplied the blunger B–P via line L–A. To induce the current of air through blunger B–P, a fan F is provided at the discharge end of the blunger.

Partially neutralized phosphoric acid coming from scrubber S goes to meter M and thence to the blunger B–P via a distribution or spray system S–S while anhydrous liquid ammonia supply is designated by reference character A and is conveyed to meter M and thence to sparger S–P for distribution at the bottom or lower portion of a bed of ammonium phosphate B. As a general rule, stoichiometric proportions of acid and ammonia are metered to blunger B–P which acts as a reactor granulator or reaction vessel. It is preferred to use an excess of ammonia and to recover the excess from the reactor and from the screens and cooler as explained hereinafter. Neutralization occurs in the films of acid on the surface of the ammonium phosphate particles in the bed in blunger B–P. This blunger has a well-known construction and is provided with a cover which prevents loss of ammonia and envelops the gases and vapors in order to return them to the scrubber S.

As those skilled in the art know, a blunger is a double action pug mill consisting of two semi-circular beds with a shaft for each bed and agitator blades connected to the shafts. One shaft turns leftwise and the other shaft turns rightwise. By turning the said shafts in the aforesaid manner, the said agitator blades mix and stir the mass of phosphate particles in the bed with a cutting and mixing action as is well known to those skilled in the art. The cover as used herein is really a box-like chamber built-up over the top of the blunger. This box-like chamber has sufficient volume to carry the air needed above the bed of phosphate granules and for sprays to carry the partially neutralized phosphoric acid from the scrubber system to the blunger. The sprays may be introduced through the top of the box chamber, or a line may carry the sprays to where the acid may be sprayed on the rotating beds. At the inlet, the box is open for observation. The air, either hot or cold, is introduced through the inlet of the box chamber as in the rotary drum. For the start-up, the blunger shafts would be rotating: a bed of say approximately 18–47–0 (N-$P_2O_5$) would be established, containing sizes —6 mesh through +60 mesh (Standard Tyler Screens). This bed would be maintained by a recycle of approximately 3 to 1 (product). The mesh sizes of the recycle would be substantially —6 mesh through plus 20 mesh with the remainder —20 mesh through —60 mesh. With the bed so established, phosphoric acid is recirculated in the scrubber system. Anhydrous ammonia gas is introduced at the bottom side of both beds by means of a sparger, and using very small pipes entering the bottom of the blunger into both semi-circular beds, and substantially the entire lengths of the beds. Next, partially neutralized phosphoric acid from the scrubber is sprayed downward on top of the beds, substantially the whole length of the beds contacting the particles of approximately 18–47–0 (N-$P_2O_5$) and forming thin films around the nuclei particles. Anhydrous ammonia gas works its way upward and diffuses causing almost instant neutralization of the thin films of phosphoric acid on the particles and causing a thin layer of approximately 18–47–0 (N-$P_2O_5$) to be firmly dried and fixed on and around the particles. Successive film build-up produces a certain amount of product size. The recycle, 3–1, furnishes the nuclei for build-up and surface area for acid distribution. The blunger action is rotary and forward. The rotary movement helps to form rounded granulated particles, and the forward movement carries the material to the blunger or reactor discharge. In other words, the agitator blades on the twin rotating shafts in the blunger continuously mix and stir the material or mass of rounded granular fertilizer particles with a cutting and mixing action and simultaneously advance said material or mass swiftly to the discharge end of the bed in the blunger. Water is being continually added, as the phosphoric acid contains water, but water is also being driven off as fast as it is added by the heat of reaction at atmospheric pressure and 212° F. The vapor, steam, excess ammonia gas, etc., i.e. the gases and vapors, are carried by the air (which is introduced on start-up at the box inlet) to the scrubber system where the excess ammonia is recovered by the circulating phosphoric acid in the scrubber system. A stoichiometric amount of the circulating scrubber acid to make approximately 18–47–0 (N-$P_2O_5$) is returned to the blunger and is sprayed continuously on the rotating bed of phosphate granules. Anhydrous ammonia gas is metered stoichiometrically to produce approximately 18–47–0 (N-$P_2O_5$). The efficiency recovery of ammonia in the reactor is from 75% to 85%, so 15% to 25% of the ammonia is recovered in the scrubber tower and returned to the reactor. The acid in the reactor receives 15% to 25% excess ammonia treatment which drives the reaction and assures a dry product and smooth operation. The phosphate granules discharged from the blunger go over a set of screens, from which product is taken off (25% when a recycle of 3:1 is used). The oversize goes to a mill for finer grinding. Seventy-five percent (when 3:1 recycle is used) goes back as recycle to the blunger and is introduced at the front of the blunger. This recycle includes ground oversize, fines, and some product either ground or not ground. Air introduced may be hot or cold; hot if conditions require it. Adsorbed and occluded ammonia gas is recovered at the screens and cooler and returned to the reactor via ducts. The functions of the blunger are almost identical to the rotary drum. It is open at the inlet for observation of the rotating bed of phosphate granules, as in the rotary drum.

From the blunger, the final product is discharged and may optionally go to dryer D–R. The dryer is needed only if the acid used is sufficiently dilute to cause too wet a final product. Such a product has a moisture content above, say, about 3.00%. The product leaving the blunger or dryer, if it is used, goes to a set of screens S–C. After screening, the finished product is discharged via line L–P. Part of the discharged product is recirculated via line L–R. The balance of the product is fed to the cooler C–L where the temperature is reduced to, say, 120° F. The cooler discharges the finished product via line L–S. It has been found that the cooling has very beneficial effects. Among these may be mentioned the elimination of deleterious effects on the materials of the bags or containers. Likewise, major handling problems with hot material are eliminated. Any tendency of hot particles to stick together, cake, set-up, etc., especially under pressure is also eliminated.

Oversize product is taken off via line L–O and goes to grinding mill G for grinding to appropriate sizes. Fines are returned via line L–F. The ground oversize, fines and the make-up from screened product are all returned to bed B in blunger B–P for further treatment.

The gases liberated in the cooler C–L and screens S–C contain much of the excess of the ammonia which was adsorbed in the product discharging from the reactor. This ammonia is recovered by conducting these gases through ducts L–G back to the blunger by any suitable means, such as a fan, etc.

Figure 3:
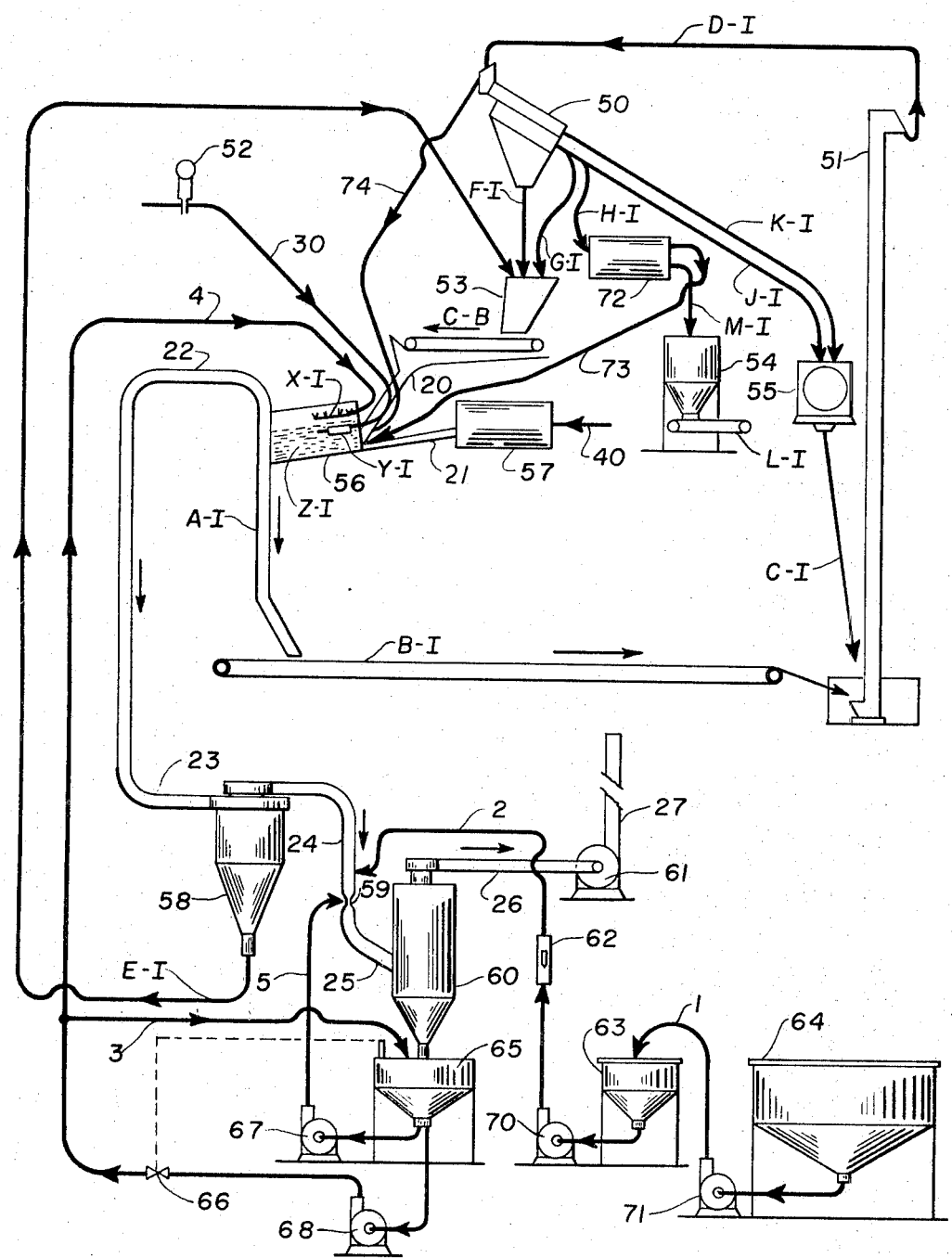
FIG. 3 depicts a diagrammatic view of a modified arrangement of equipment also capable of carrying the invention into practice.

Referring to FIG. 3 of the drawing, an arrangement of equipment is illustrated when the present process is carried into practice without the use of a dryer. A supply of recycled ammonium phosphate comes from surge bin 53 and is conveyed by belt CB to a chute where the recycle is discharged into the rotating reactor 56. This recycled material supplies the ammonium phosphate bed Z–I in the reactor. Anhydrous ammonia is metered through meter 52 and flows via line 30 to a sparger Y–I submerged in the bed of ammonium phosphate. At the same time, partially neutralized phosphoric acid is supplied by pump 68 via line 4 to the phosphoric acid spray-line X–I above the ammonium phosphate bed in the reactor. The phosphoric acid flow is controlled by meter 62. Hot combustion gases are supplied by burner 57 and the hot combustion gases are introduced via pipe 21 into the reactor. Extra unheated air is introduced in the open end of the reactor at point 20. The hot combustion gases and air so mentioned are introduced into reactor 56 by means of a suction fan 61. The suction fan 61 pulls the gases, along with the unreacted or excess ammonia gas, through reactor gas discharge pipe 22. The gases go then to gas cyclone intake 23 into cyclone 58 and out of the top of cyclone 58 into gas inlet 24 to venturi 59 and through gas inlet 25 to mist separator 60. From mist separator 60, the gases are drawn through gas mist separator discharge 26 and through fan 61 and out to atmosphere via fan discharge 27. The phosphoric acid is supplied by mixing tank 64 and is transferred by pump 71 via pipe 1 to surge tank 63. Pump 70 supplies phosphoric acid through meter 62 via line 2 to venturi scrubber 59. The incoming phosphoric acid absorbs ammonia contained in the exhaust gases from the gas discharge pipe 22 from the reactor 56. By absorbing ammonia, the phosphoric acid is partially neutralized. The partially neutralized phosphoric acid goes from venturi scrubber via inlet 25 to mist separator 60 and from mist separator 60 the phosphoric acid drops by gravity into constant level tank 65. A continuous portion of the acid in the constant level tank 65 is drawn off at the bottom by pump 68 to feed the reactor 56 via line 4 and a constant level is maintained in tank 65 by means of level control 66. A continuous volume of the acid is recycled from the bottom of the constant level tank 65 via pump 67 through pipe 5 to supply acid to venturi scrubber 59.

Solid product discharges from reactor 56 onto belt A–I and from belt A–I onto belt B–I and thence into the foot of elevator 51. From elevator 51 the product goes via D–I to screens 50. Oversizes from screens 50 go via conveyor K–I to a mill 55 and via C–I to elevator 51. The fines from screens 50 go via conveyor F–I to surge bin 53. The production take-off of product size goes via conveyor H–I to cooler 72. The product is cooled and discharges via belt M–I into product bin 54.

The remaining portion of product or a fraction thereof may be diverted via conveyor J–I to mill 55 and via conveyor C–I to elevator 51 if more fines are needed in the recycle. The rest of the product size goes via conveyor G–I to surge bin 53. In the event that no further fines are needed, all of the surplus product size may go via conveyor G–I to surge supply bin 53 for recycle and further treatment in the process. The dust product from cyclone 58 is conveyed via E–I to surge bin 53.

The gases evolved in cooler 72 and screens 50 contain excess ammonia which was adsorbed on the product. These gases are returned to the reactor 56 via lines 73 and 74, respectively. Of course, the excess ammonia can be recovered in any suitable manner. For instance, the excess ammonia can be returned or recycled to any appropriate preceding operation in the method, such as the scrubbing operation where excess ammonia coming from the reactor is absorbed in phosphoric acid.

For the purpose of giving those skilled in the art a better understanding of the invention and/or a better appreciation of the advantages of the invention, the following illustrative examples are given:

EXAMPLE NO. 1

A bed is established which is composed of about 4,600 parts by weight of di-ammonium phosphate [approximately 18–47–0 ($N-P_2O_5$)]. This bed consisted of about 2,600 parts by weight of −8 +12 mesh and about 2,000 parts by weight of −12 mesh material and contained about 17.20% nitrogen and about 46.87% A.P.A. While rotating the drum, about 341 parts by weight of anhydrous ammonia is continuously introduced in the bottom of the bed, and about 43% $P_2O_5$ phosphoric acid is continuously sprayed on top of the bed. It usually takes not less than about five minutes for the product to go through the drums. More time is required depending on the tonnage produced and the desired particle size. The final product obtained had about 2.00% of moisture and analyzed about 48.03% total $P_2O_5$, about 0.02% citrate insoluble $P_2O_5$, about 48.01% A.P.A., and about 17.51% nitrogen.

Figure 7:
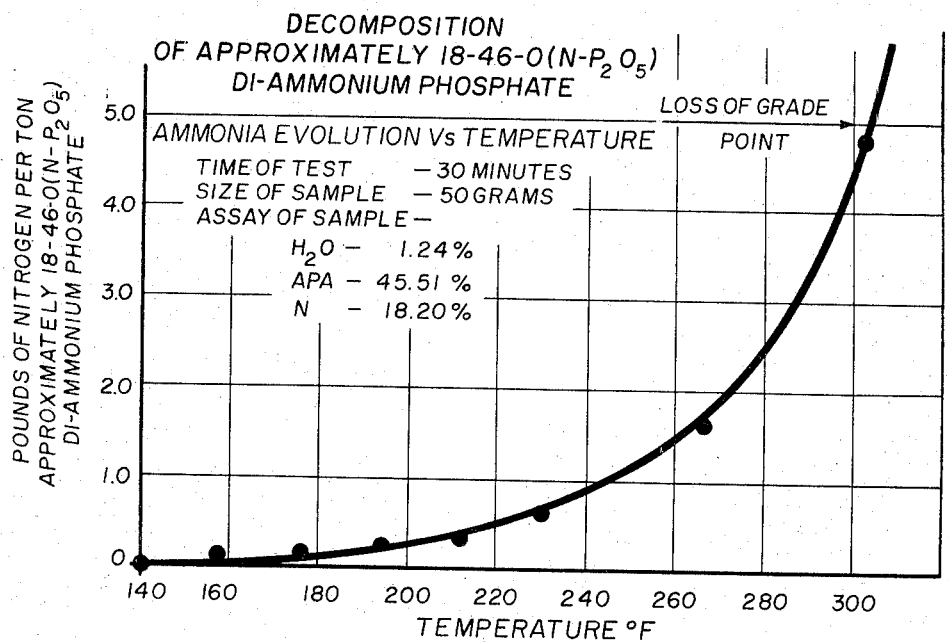
FIG. 7 illustrates a curve of the decomposition of approximately 18–46–0 ($N-P_2O_5$) di-ammonium phosphate with ammonia evolution plotted against temperature.
Figure 8:
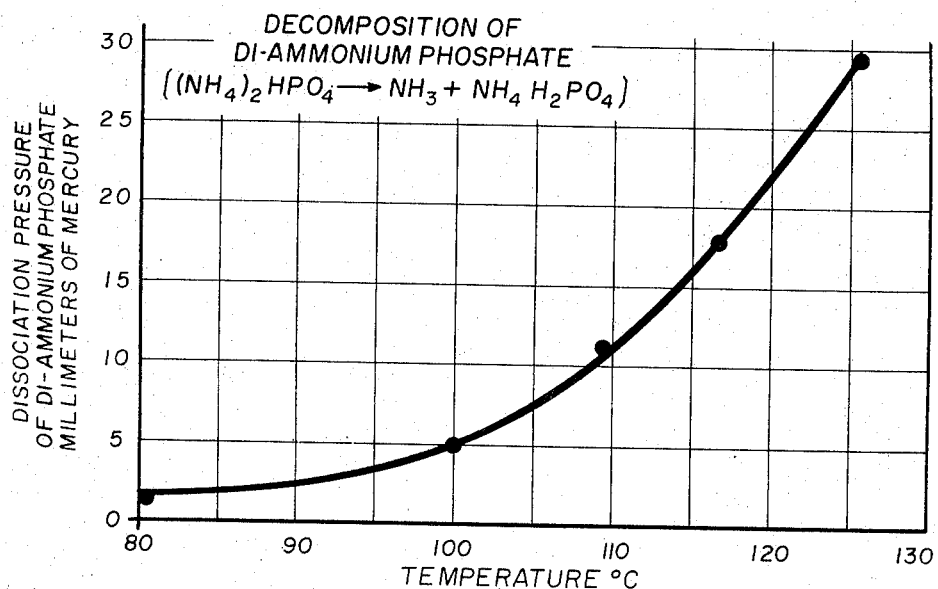
FIG. 8 is similar to FIG. 7 except that the dissociation pressure of pure di-ammonium phosphate in millimeters of mercury is plotted against temperature.

Results indicate that ammoniation of the acid can be effected with a recovery or fixation recovery of the ammonia by returning the vapors from the rotating drum to be reabsorbed by the incoming phosphoric acid and should reduce losses of ammonia to less than about 1%. Other mixes were made in which the nitrogen content exceeded 18%, such as about 19, 20 or 21% or so, and $P_2O_5$ varied according to acid purity. Control of the pH to a value of about 7.6 should insure a preferred stable 18–47–0 ($N-P_2O_5$) grade of granular product. Hot air can be used as a draft in the reaction vessel and enough moisture driven off to be able to reduce recirculation loads. In addition, other advantages are obtained by using hot air as disclosed hereinbefore. Temperature control is not critical provided temperatures are maintained within the mass of particles in the bed below the decomposition temperature of di-ammonium phosphate. The dissociation pressure of the dry, solid diammonium phosphate is given by Waggaman as about 5 mm. of mercury at 100° C. and about 30 mm. at 125° C. As the 18–47–0 grade is not a pure di-ammonium salt, it would probably take a higher heat to decompose it. As those skilled in the art know, the curves giving these temperatures are available in the scientific and technical literature, and, when not available, are easily ascertained by well-known tests. For instance, decomposition curves are illustrated in FIGS. 7 and 8 and are described hereinafter.

EXAMPLE NO. 2

For the production of a fertilizer preferably containing granular di-ammonium phosphate having an approximate analysis of 18–47–0 ($N-P_2O_5$) and an actual analysis of 18.5–47.06–0 ($N-P_2O_5$) in accordance with the present invention, the following operations were employed. Substantially dry, solid di-ammonium phosphate granulated to a substantially spherical form and constituted of substantially uniform granules was used as the solid bed in the rotating drum. These granules contained sizes comprising about minus 6 mesh through about plus 60 mesh. By so doing, a soiled bed is established as a substantially moving horizontal rotating mass which moves from the open inlet of said drum to the outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed is composed chiefly of about minus 6 mesh to about plus 20 mesh granules with a remainder of minus 20 mesh through minus 60 mesh. When the solid bed is established, liquid phosphoric acid is recirculated through the scrubbing system. Sufficient air is introduced through the inlet of the reactor or rotary drum to carry away the moisture, excess ammonia and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 3.25 pounds, whereas when a preferred temperature of 170° F. prevails in the outgoing air carrying the ammonia and other gases and vapors, then the minimum quantity should be about 1.04 pounds. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where liquid phosphoric acid absorbs excess ammonia present in said gases and vapors. Anhydrous ammonia is introduced near the bottom of the bed and throughout substantially the entire length of the bed. The ammonia gas makes its way upward and diffuses through the bed and envelops the granules in the solid rotating bed. Phosphoric acid conveyed from the scrubber system is sprayed downwards on top of the rotating horizontally moving bed and covers the surfaces of the granules with liquid films. The established bed is maintained by a recycle feed of approximately 3:1 with respect to the product and furnishes the surface area for the exposure of the acid which forms thin films around the nuclei particles. Thin films of approximately 18–47–0 ($N-P_2O_5$) are successively built up around the nuclei particles to form a final product. Approximately twenty-five percent (25%) of the discharge from the reactor comprising mainly particles of minus 6 mesh plus 12 mesh (Standard Tyler Screens), is removed from the system as products. During the operation of neutralizing the phosphoric acid with the anhydrous ammonia, the solid bed of particles are in contact with each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of di-ammonium phosphate having an analysis of approximately 18–47–0 ($N-P_2O_5$). Phosphoric acid from the scrubber containing some nitrogen is sprayed substantially all over the top of the solid bed of contacting particles. In the scrubber, the phosphoric acid is partially neutralized by the ammonia and the partially neutralized acid leaving the scrubber has an $N-P_2O_5$ composition of approximately 3.9–40.5–0. Water is being continually added as the liquid phosphoric acid contains water. However, water is also being continually driven off in the form of vapor and/or steam at about 212° F. at atmospheric pressure by the heat of reaction. The air introduced through the system may or may not be heated. Likewise, when the relative humidity is high, the air should preferably be heated. In cases where there is more water to be driven off than the heat of reaction can take care of, the air should be heated. The wet process phosphoric acid having a concentration of about 39.0% $P_2O_5$ and ammonia are controlled by metering in stoichiometric quantities or amounts to produce di-ammonium phosphate analyzing approximately 18–47–0 ($N-P_2O_5$). The efficiency of the reactor is somewhere between 75% to 85%, so the scrubber phosphoric acid recaptures the 15% to 25% excess ammonia. Such recaptured ammonia is returned to the reactor combined with the wet process phosphoric acid from the scrubber.

The granular product from the reactor goes to a set of screens where the desired or final product (minus 6 mesh through plus 12 mesh) is removed. The plus 6 mesh and other oversize go to a milling system to be ground to about minus 6 mesh through about minus 60. The desired or final product removed is approximately 25% of the weight of the entire product from the reactor discharge. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the acid or decreasing the concentration of the acid or stoppage of acid sprays, or stoppage of ammonia sparger, etc.

EXAMPLE NO. 3

For the production of a fertilizer preferably containing granular ammonium phosphate having an approximate analysis of 12–52–0 ($N-P_2O_5$) and an actual analysis of 12–52.10–0 ($N-P_2O_5$) in accordance with the present invention the following operations were employed. Substantially dry, solid ammonium phosphate [approximately 12–52–0 ($N-P_2O_5$)] and granulated to a substantially spherical form and constituted of substantially uniform granules was used as the solid bed in the reactor or rotating drum. These granules contained sizes comprising about minus 6 mesh through about plus 60 mesh. By so doing, a solid bed is established as a substantially moving horizontal rotating mass which moves from the open inlet of said drum to the open outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed of about 300 parts by weight is composed chiefly of about minus 6 mesh to about plus 20 mesh granules with a remainder of minus 20 mesh through minus 60 mesh. When the solid bed is established, about 100 parts by weight of wet process phosphoric acid containing about 52% of $P_2O_5$ is recirculated through the scrubbing system. Sufficient air is introduced through the inlet of the reactor or rotary drum to carry away the moisture, excess ammonia, and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 1.12 pounds, whereas when a preferred temperature of 170° F. prevails in the outgoing air carrying the ammonia and other gases and vapors, then the minimum quantity should be about 0.36 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where wet process phosphoric acid absorbs ammonia present in said gases and vapors to the extent of about 3.6 parts by weight. About 14.6 parts by weight of anhydrous ammonia is introduced near the bottom of the bed and throughout substantially the entire length of the bed. The ammonia gas makes its way upward and diffuses throughout the bed and envelops the granules in the solid rotating bed. Phosphoric acid conveyed from the scrubber system is sprayed downwards on top of the rotating horizontally moving bed and covers the surfaces of the granules with liquid films. The established bed is maintained by a recycle feed of approximately 12–52–0 ($N-P_2O_5$) and of approximately 3:1 with respect to the product and furnishes the surface area for the exposure of the acid which forms thin films around the nuceli particles. Thin films of approximately 12–52–0 ($N-P_2O_5$) are successively built up around the nuceli particles to form a final product. As the granules roll around in contact with other granules, they are rounded and form finished round granules useful for final product or for recycle feed. About 400 parts by weight of product are discharged from the reactor as rounded granules containing approximately 12–52–0 ($N-P_2O_5$). Approximately twenty-five percent (25%) of the discharge of rounded granules from the reactor comprising mainly particles of minus 6 mesh plus 12 mesh (Standard Tyler Screens) is removed from the system as fertilizer products. In other words, about 100 parts by weight of final product are removed.

During the operation of neutralizing the phosphoric acid with the anhydrous ammonia, the solid bed of particles are in contact with each other and the particles are given a forward rolling movement by the action of the reactor or the rotary drum. The forward movement carried the material in the reactor to the discharge or outlet end of the reactor. The rolling movement of the particles in contact with each other rounds off the particles built up with successive layers of ammonium phosphate having an analysis of approximately 12–52–0 ($N-P_2O_5$). Wet process phosphoric acid from the scrubber containing some nitrogen is sprayed substantially all over the top of the solid bed of contacting particles. In the scrubber, the phosphoric acid is partially neutralized by the ammonia and the partially neutralized acid leaving the scrubber has an N-$P_2O_5$ composition of approximately 3.6–53.5–0. Water is being continually added as the liquid phosphoric acid contains water. However, water is also being continually driven off in the form of vapor and/or steam at about 212° F. at atmospheric pressure by the heat of reaction from the solid bed rotating within the reactor. The air introduced through the system may or may not be heated. For start-up, the air should preferably be heated. Likewise, when the relative humidity is high, the air should preferably be heated. In cases where there is more water to be driven off than the heat of reaction can take care of, the air should be heated. The wet process phosphoric acid having a concentration of about 52% $P_2O_5$ and ammonia are controlled by metering in stoichiometric quantities or amounts to produce ammonium phosphate analyzing 12–52–0 (N-$P_2O_5$). The efficiency of the reactor is somewhere between 75% and 85%, so the scrubber phosphoric acid recaptures the 15% to 25% excess ammonia. Such recaptured ammonia is returned to the reactor combined with the wet process phosphoric acid from the scrubber. In the present example, this recaptured or absorbed ammonia constitutes about 3.6 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the acid or decreasing the concentration of the acid or stoppage of acid sprays or stoppage of ammonia sparger, etc.

EXAMPLE NO. 4

For the production of a fertilizer preferably containing granular di-ammonium phosphate having an approximate analysis of 15.5–50–0 (N-$P_2O_5$) and an actual analysis of 15.55–50–0 (N-$P_2O_5$) in accordance with the present invention, the following operations were employed. Substantially dry, solid di-ammonium phosphate approximating 15.5–50–0 (N-$P_2O_5$) and granulated to a substantially spherical form and constituted of substantially uniform granules was used as the solid bed in the reactor or rotating drum. These granules contained sizes comprising about minus 6 mesh through about plus 60 mesh. By so doing, a solid bed is established as a substantially moving horizontal rotating mass which moves from the open inlet of said drum to the open outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed of about 300 parts by weight is composed chiefly of about minus 6 mesh to about plus 20 mesh granules with a remainder of minus 20 mesh through minus 60 mesh. When the solid bed is established, about 111 parts by weight of wet process phosphoric acid containing about 45% $P_2O_5$ is recirculated through the scrubbing system. Sufficient air is introduced through the inlet of the reactor or rotary drum to carry away the moisture, excess ammonia and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 2.30 pounds, whereas when a preferred temperature of 170° F. prevails in the outgoing air carrying the ammonia and other gases and vapors, then the minimum quantity should be about 0.73 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where wet process phosphoric acid absorbs ammonia present in said gases and vapors to the extent of about 5 parts by weight. In the scrubber, the phosphoric acid is partially neutralized by the ammonia and the partially neutralized acid leaving the scrubber has an N-$P_2O_5$ composition of approximately 4.7–46.5–0. About 19 parts by weight of anhydrous ammonia is introduced near the bottom of the bed and throughout substantially the entire length of the bed. The ammonia gas makes its way upward and diffuses throughout the bed and envelops the granules in the solid rotating bed. Phosphoric acid conveyed from the scrubber system is sprayed downwards on top of the rotating horizontally moving bed and covers the surfaces of the granules with liquid films. The established bed is maintained by a recycle feed of approximately 15.5–50–0 (N-$P_2O_5$) and of approximately 3:1 with respect to the product and furnishes the surface area for the exposure of the acid which forms thin films around the nuclei particles. Thin films of approximately 15.5–50–0 (N-$P_2O_5$) are successively built up around the nuclei particles to form a final product. As the granules roll around in contact with other granules, they are rounded and form finished round granules useful for final product or for recycle feed. About 400 parts by weight of product are discharged from the reactor as rounded granules containing approximately 15.5–50–0 (N-$P_2O_5$). Approximately twenty-five percent (25%) of the discharge of rounded granules from the reactor comprising mainly particles of minus 6 mesh plus 12 mesh (Standard Tyler Screens) is removed from the system as fertilizer products. In other words, about 100 parts by weight of final product are removed.

During the operation of neutralizing the phosphoric acid with the anhydrous ammonia, the solid bed of particles are in contact with each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of di-ammonium phosphate having an analysis of approximately 15.5–50–0 (N-$P_2O_5$). Wet process phosphoric acid from the scrubber containing some nitrogen is sprayed substantially all over the top of the solid bed of contacting particles. Water is being continually added as the liquid phosphoric acid contains water. However, water is also being continually driven off in the form of vapor and/or steam at about 212° F. at atmospheric pressure by the heat of reaction from the solid bed rotating within the reactor. The air introduced through the system may or may not be heated. For start-up, the air should preferably be heated. Likewise, when the relative humidity is high, the air should preferably be heated. In cases where there is more water to be driven off than the heat of reaction can take care of, the air should be heated. The wet process phosphoric acid having a concentration of about 45% $P_2O_5$ and ammonia are controlled by metering in stoichiometric quantities or amounts to produce di-ammonium phosphate analyzing 15.5–50–0 (N-$P_2O_5$). The efficiency of the reactor is somewhere between 75% and 85%, so the scrubber phosphoric acid recaptures the 15% to 25% excess ammonia. Such recaptured ammonia is returned to the reactor combined with the wet process phosphoric acid from the scrubber. In the present example, this recaptured or absorbed ammonia constitutes about 5 parts by weight.

The rounded granular product from the reactor goes to a set of screens where the desired or final product (minus 6 mesh through 12 mesh) is removed. The plus 6 mesh and other oversize go to a millin gor grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the acid or decreasing the concentration of the acid or stoppage of acid sprays, or stoppage of ammonia sparger, etc.

EXAMPLE NO. 5

For the production of a fertilizer preferably containing granular ammonium phosphate having an approximate analysis of 14–50–0 (N-$P_2O_5$) and an actual analysis of 14.20–50.45–0 (N-$P_2O_5$) in accordance with the present invention, the following operations were employed. Substantially dry, solid ammonium phosphate approximating 14–50–0 (N-$P_2O_5$) and granulated to a substantially spherical form and constituted of substantially uniform granules was used as the solid bed in the reactor or rotating drum. These granules contained sizes comprising about minus 6 mesh through about plus 60 mesh. By so doing, a solid bed is established as a substantially moving horizontal rotating mass which moves from the open inlet of said drum to the open outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed of about 300 parts by weight is composed chiefly of about minus 6 mesh to about plus 20 mesh granules with a remainder of minus 20 mesh through minus 60 mesh. When the solid bed is established, about 109 parts by weight of wet process phosphoric acid containing about 46% $P_2O_5$ is recirculated through the scrubbing system. Sufficient air is introduced through the inlet of the reactor or rotary drum to carry away the moisture, excess ammonia and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 1.99 pounds, whereas when a preferred temperature of 170° F. prevails in the outgoing air carrying the ammonia and other gases and vapors, then the minimum quantity should be about 0.63 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where wet process phosphoric acid absorbs ammonia present in said gases and vapors to the extent of about 4.2 parts by weight. In the scrubber, the phosphoric acid is partially neutralized by the ammonia and the partially neutralized acid leaving the scrubber has an N-$P_2O_5$ composition of approximately 4.0–47.5–0. About 17 parts by weight of anhydrous ammonia is introduced near the bottom of the bed and throughout substantially the entire length of the bed. The ammonia gas makes its way upward and diffuses throughout the bed and envelops the granules in the solid rotating bed. Phosphoric acid conveyed from the scrubber system is sprayed downwards on top of the rotating horizontally moving bed and covers the surfaces of the granules with liquid films. The established bed is maintained by a recycle feed of approximately 14–50–0 (N-$P_2O_5$) and of approximately 3:1 with respect to the product and furnishes the surface area for the exposure of the acid which forms thin films around the nuclei particles. Thin films of approximately 14–50–0 (N-$P_2O_5$) are successively built up around the nuclei particles to form a final product. As the granules roll around in contact with other granules, they are rounded and form finished round granules useful for final product or for recycle feed. About 400 parts by weight of product are discharged from the reactor as rounded granules containing approximately 14–50–0 (N-$P_2O_5$). Approximately twenty-five percent (25%) of the discharge of rounded granules from the reactor comprising mainly particles of minus 6 mesh plus 12 mesh (Standard Tyler Screens) is removed from the system as fertilizer products. In other words, about 100 parts by weight of final product are removed.

During the operation of neutralizing the phosphoric acid with the anhydrous ammonia, the solid bed of particles are in contact with each other and the particles are given a forward rolling movement by the action of the reactor or the rotary drum. The forward movement carried the material in the reactor to the discharge or outlet end of the reactor. The rolling movement of the particles in contact with each other rounds off the particles built up with successive layers of ammonium phosphate having an analysis of approximately 14–50–0 (N-$P_2O_5$). Wet process phosphoric acid from the scrubber containing some nitrogen is sprayed substantially all over the top of the solid bed of contacting particles. Water is being continually added as the liquid phosphoric acid contains water. However, water is also being continually driven off in the form of vapor and/or steam at about 212° F. at atmospheric pressure by the heat of reaction from the solid bed rotating within the reactor. The air introduced through the system may or may not be heated. For start-up, the air should preferably be heated. Likewise, when the relative humidity is high, the air should preferably be heated. In cases where there is more water to be driven off than the heat of reaction can take care of, the air should be heated. The wet process phosphoric acid having a concentration of about 46 $P_2O_5$ and ammonia are controlled by metering in stoichiometric quantities or amounts to produce ammonium phosphate analyzing 14–50–0 (N-$P_2O_5$). The efficiency of the reactor is somewhere between 75% and 85%, so the scrubber phosphoric acid recaptures the 15% to 25% excess ammonia. Such recaptured ammonia is returned to the reactor combined with the wet process phosphoric acid from the scrubber. In the present example, this recaptured or absorbed ammonia constitutes about 4.2 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the acid or decreasing the concentration of the acid or stoppage of acid sprays, or stoppage of ammonia sparger, etc.

EXAMPLE NO. 6

For the production of a fertilizer preferably containing granular di-ammonium phosphate having an approximate analysis of 16.75–49–0 ($N-P_2O_5$) and an actual analysis of 16.75–48.83–0 ($N-P_2O_5$) in accordance with the present invention, the following operations were employed. Substantially dry, solid di-ammonium phosphate approximating 16.75–49–0 ($N-P_2O_5$) and granulated to a substantially spherical form and constituted of substantially uniform granules was used as the solid bed in the reactor or rotating drum. These granules contained sizes comprising about minus 6 mesh through about plus 60 mesh. By so doing, a solid bed is established as a substantially moving horizontal rotating mass which moves from the open inlet of said drum to the open outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed of about 300 parts by weight is composed chiefly of about minus 6 mesh to about plus 20 mesh granules with a remainder of minus 20 mesh through minus 60 mesh. When the solid bed is established, about 114 parts by weight of wet process phosphoric acid containing about 43% $P_2O_5$ is recirculated through the scrubbing system. Sufficient air is introduced through the inlet of the reactor or rotary drum to carry away the moisture, excess ammonia and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 2.63 pounds, whereas when a preferred temperature of 170° F. prevails in the outgoing air carrying the ammonia and other gases and vapors, then the minimum quantity should be about 0.84 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where wet process phosphoric acid absorbs ammonia present in said gases and vapors to the extent of about 5 parts by weight. In the scrubber, the phosphoric acid is partially neutralized by the ammonia and the partially neutralized acid leaving the scrubber has an $N-P_2O_5$ composition of approximately 4.4–44.5–0. About 20.4 parts by weight of anhydrous ammonia is introduced near the bottom of the bed and throughout substantially the entire length of the bed. The ammonia gas makes its way upward and diffuses throughout the bed and envelops the granules in the solid rotating bed. Phosphoric acid conveyed from the scrubber system is sprayed downwards on top of the rotating horizontally moving bed and covers the surfaces of the granules with liquid films. The established bed is maintained by a recycle feed of approximately 16.75–49–0 ($N-P_2O_5$) and of approximately 3:1 with respect to the product and furnishes the surface area for the exposure of the acid which forms thin films around the nuclei particles. Thin films of approximately 16.75–49–0 ($N-P_2O_5$) are successively built up around the nuclei particles to form a final product. As the granules roll around in contact with other granules, they are rounded and form finished round granules useful for final product or for recycle feed. About 400 parts by weight of product are discharged from the reactor as rounded granules containing approximately 16.75–49–0 ($N-P_2O_5$). Approximately twenty-five percent (25%) of the discharge of rounded granules from the reactor comprising mainly particles of minus 6 mesh plus 12 mesh (Standard Tyler Screens) is removed from the system as fertilizer products. In other words, about 100 parts by weight of final product are removed.

During the operation of neutralizing the phosphoric acid with the anhydrous ammonia, the solid bed of particles are in contact with each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of di-ammonium phosphate having an analysis of approximately 16.75–49–0 ($N-P_2O_5$). Wet process phosphoric acid from the scrubber containing some nitrogen is sprayed substantially all over the top of the solid bed of contacting particles. Water is being continually added as the liquid phosphoric acid contains water. However, water is also being continually driven off in the form of vapor and/or steam at about 212° F. at atmospheric pressure by the heat of reaction from the solid bed rotating within the reactor. The air introduced through the system may or may not be heated. For startup, the air should preferably be heated. Likewise, when the relative humidity is high, the air should preferably be heated. In cases where there is more water to be driven off than the heat of reaction can take care of, the air should be heated. The wet process phosphoric acid having a concentration of about 43% $P_2O_5$ and ammonia are controlled by metering in stoichiometric quantities or amounts to produce di-ammonium phosphate analyzing 16.75–49–0 ($N-P_2O_5$). The efficiency of the reactor is somewhere between 75% and 85%, so the scrubber phosphoric acid recaptures the 15% to 25% excess ammonia. Such recaptured ammonia is returned to the reactor combined with the wet process phosphoric acid from the scrubber. In the present example, this recaptured or absorbed ammonia constitutes about 5 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the acid or decreasing the concentration of the acid or stoppage of acid sprays or stoppage of ammonia sparger, etc.

EXAMPLE NO. 7

For the production of a fertilizer preferably containing granular di-ammonium phosphate having an approximate analysis of 17–48–0 ($N$-$P_2O_5$) and an actual analysis of 16.94–48.37–0 ($N$-$P_2O_5$) in accordance with the present invention, the following operations were employed. Substantially dry, solid di-ammonium phosphate granulated to a substantially spherical form and constituted of substantially uniform granules was used as the solid bed in the reactor or rotating drum. These granules contained sizes comprising about minus 6 mesh through about plus 60 mesh. By so doing, a solid bed is established as a substantially moving horizontal rotating mass which moves from the open inlet of said drum to the open outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed of about 300 parts by weight is composed chiefly of about minus 6 mesh to about plus 20 mesh granules with a remainder of minus 20 mesh through minus 60 mesh. When the solid bed is established, about 114 parts by weight of wet process phosphoric acid containing about 42% $P_2O_5$ is recirculated through the scrubbing system. Sufficient air is introduced through the inlet of the reactor or rotary drum to carry away the moisture, excess ammonia, and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 2.65 pounds, whereas when a preferred temperature of 170° F. prevails in the outgoing air carrying the ammonia and other gases and vapors, then the minimum quantity should be about 0.85 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where wet process phosphoric acid absorbs ammonia present in said gases and vapors to the extent of about 5.1 parts by weight. In the scrubber, the phosphoric acid is partially neutralized by the ammonia and the partially neutralized acid leaving the scrubber has an $N$-$P_2O_5$ composition of approximately 4.5–43.5–0. About 20.7 parts by weight of anhydrous ammonia is introduced near the bottom of the bed and throughout substantially the entire length of the bed. The ammonia gas makes its way upward and diffuses throughout the bed and envelops the granules in the solid rotating bed. Phosphoric acid conveyed from the scrubber system is sprayed downwards on top of the rotating horizontally moving bed and covers the surfaces of the granules with liquid films. The established bed is maintained by a recycle feed of approximately 17–48–0 ($N$-$P_2O_5$) and of approximately 3:1 with respect to the product and furnishes the surface area for the exposure of the acid which forms thin films around the nuclei particles. Thin films of approximately 17–48–0 ($N$-$P_2O_5$) are successively built up around the nuclei particles to form a final product. As the granules roll around in contact with other granules, they are rounded and form finished round granules useful for final product or for recycle feed. About 400 parts by weight of product are discharged from the reactor as rounded granules containing approximately 17–48–0 ($N$-$P_2O_5$). Approximately twenty-five percent (25%) of the discharge of rounded granules from the reactor comprising mainly particles of minus 6 mesh plus 12 mesh (Standard Tyler Screens) is removed from the system as fertilizer products. In other words, about 100 parts by weight of final product are removed.

During the operation of neutralizing the phosphoric acid with the anhydrous ammonia, the solid bed of particles are in contact with each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of di-ammonium phosphate having an analysis of approximately 17–48–0 ($N$-$P_2O_5$). Wet process phosphoric acid from the scrubber containing some nitrogen is sprayed substantially all over the top of the solid bed of contacting particles. Water is being continually added as the liquid phosphoric acid contains water. However, water is also being continually driven off in the form of vapor and/or steam at about 212° F. at atmospheric pressure by the heat of reaction from the solid bed rotating within the reactor. The air introduced through the system may or may not be heated. For startup, the air should preferably be heated. Likewise, when the relative humidity is high, the air should preferably be heated. In cases where there is more water to be driven off than the heat of reaction can take care of, the air should be heated. The wet process phosphoric acid having a concentration of about 42% $P_2O_5$ and ammonia are controlled by metering in stoichiometric quantities or amounts to produce di-ammonium phosphate analyzing 17–48–0 ($N$-$P_2O_5$). The efficiency of the reactor is somewhere between 75% and 85%, so the scrubber phosphoric acid recaptures the 15% to 25% excess ammonia. Such recaptured ammonia is returned to the reactor combined with the wet process phosphoric acid from the scrubber. In the present example, this recaptured or absorbed ammonia constitutes about 5.1 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the acid or decreasing the concentration of the acid or stoppage of acid sprays or stoppage of ammonia sparger, etc.

EXAMPLE NO. 8

For the production of a fertilizer preferably containing granular ammonium phosphate having an approximate analysis of 14.5–49–0 ($N-P_2O_5$) and an actual analysis of 14.57–48.77–0 ($N-P_2O_5$) in accordance with the present invention, the following operations were employed. Substantially dry, solid ammonium phosphate approximating 14.5–49–0 ($N-P_2O_5$) and granulated to a substantially spherical form and constituted of substantially uniform granules was used as the solid bed in the reactor or rotating drum. These granules contained sizes comprising about minus 6 mesh through about plus 60 mesh. By so doing, a solid bed is established as a substantially moving horizontal rotating mass which moves from the open inlet of said drum to the open outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed of about 300 parts by weight is composed chiefly of about minus 6 mesh to about plus 20 mesh granules with a remainder of minus 20 mesh through minus 60 mesh. When the solid bed is established, about 111 parts by weight of wet process phosphoric acid containing about 44% $P_2O_5$ is recirculated through the scrubbing system. Sufficient air is introduced through the inlet of the reactor or rotary drum to carry away the moisture, excess ammonia and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 2.19 pounds, whereas when a preferred temperature of 170° F. prevails in the outgoing air carrying the ammonia and other gases and vapors, then the minimum quantity should be about 0.70 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where wet process phosphoric acid absorbs ammonia present in said gases and vapors to the extent of about 4.4 parts by weight. In the scrubber, the phosphoric acid is partially neutralized by the ammonia and the partially neutralized acid leaving the scrubber has an $N-P_2O_5$ composition of approximately 4.0–45.5–0. About 17.6 parts by weight of anhydrous ammonia is introduced near the bottom of the bed and throughout substantially the entire length of the bed. The ammonia gas makes its way upward and diffuses throughout the bed and envelops the granules in the solid rotating bed. Phosphoric acid conveyed from the scrubber system is sprayed downwards on top of the rotating horizontally moving bed and covers the surfaces of the granules with liquid films. The established bed is maintained by a recycle feed of approximately 14.5–49–0 ($N-P_2O_5$) and of approximately 3:1 with respect to the product and furnishes the surface area for the exposure of the acid which forms thin films around the nuclei particles. Thin films of approximately 14.5–49–0 ($N-P_2O_5$) are successively built up around the nuclei particles to form a final product. As the granules roll around in contact with other granules, they are rounded and form finished round granules useful for final product or for recycle feed. About 400 parts by weight of product are discharged from the reactor as rounded granules containing approximately 14.5–49–0 ($N-P_2O_5$). Approximately twenty-five percent (25%) of the discharge of rounded granules from the reactor comprising mainly particles of minus 6 mesh plus 12 mesh (Standard Tyler Screens) is removed from the system as fertilizer products. In other words, about 100 parts by weight of final product are removed.

During the operation of neutralizing the phosphoric acid with the anhydrous ammonia, the solid bed of particles are in contact with each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of ammonium phosphate having an analysis of approximately 14.5–49–0 ($N-P_2O_5$). Wet process phosphoric acid from the scrubber containing some nitrogen is sprayed substantially all over the top of the solid bed of contacting particles. Water is being continually added as the liquid phosphoric acid contains water. However, water is also being continually driven off in the form of vapor and/or steam at about 212° F. at atmospheric pressure by the heat of reaction from the solid bed rotating within the reactor. The air introduced through the system may or may not be heated. For starting up, the air should preferably be heated. Likewise, when the relative humidity is high, the air should preferably be heated. In cases where there is more water to be driven off than the heat of reaction can take care of, the air should be heated. The wet process phosphoric acid having a concentration of about 44% $P_2O_5$ and ammonia are controlled by metering in stoichiometric quantities or amounts to produce ammonium phosphate analyzing 14.5–49–0 ($N-P_2O_5$). The efficiency of the reactor is somewhere between 75% and 85%, so the scrubber phosphoric acid recaptures the 15% to 25% excess ammonia. Such recaptured ammonia is returned to the reactor combined with the wet process phosphoric acid from the scrubber. In the present example, this recaptured or absorbed ammonia constitutes about 4.4 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the acid or decreasing the concentration of the acid or stoppage of acid sprays, or stoppage of ammonia sparger, etc.

EXAMPLE NO. 9

For the production of a fertilizer preferably containing granular di-ammonium phosphate containing a relatively high percentage of $P_2O_5$ in accordance with the present invention, the following operations have been employed. Substantially dry, solid di-ammonium phosphate granulated to a substantially spherical form and constituted of substantially uniform granules was used as the solid bed in the rotating reactor or drum. These granules analyzed approximately 19–49–0 ($N-P_2O_5$) and contained sizes comprising about minus 6 mesh through about plus 60 mesh. By so doing, a solid bed is established as a substantially moving horizontal rotating mass which moves from the open inlet of said drum to the outlet thereof. For practical purposes, especially of an industrial character, the depth of the bed should preferably not be less than about one-half of one foot, but may be of the order of several feet, depending on the diameter of the rotary drum. The bulk or major portion of the recycle feed of 300 parts by weight is composed chiefly of about minus 6 mesh to about plus 20 mesh granules with a remainder of minus 20 mesh through minus 60 mesh. When the solid bed is established, about 129 parts by weight of clarified wet process phosphoric acid containing approximately 38% $P_2O_5$ is recirculated through the scrubbing system. Sufficient air is introduced through the inlet of the reactor or rotary drum to carry away the moisture, excess ammonia, and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 3.99 pounds, whereas when a preferred temperature of 170° prevails in the outgoing air carrying the ammonia and other gases and vapors, then the minimum quantity should be about 1.27 pounds. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where clarified wet process phosphoric acid absorbs excess ammonia present in said gases and vapors to the extent of about 5.8 parts by weight. In the scrubber, the phosphoric acid is partially neutralized by the ammonia and the partially neutralized acid leaving the scrubber has an $N-P_2O_5$ composition of approximately 4.5–39.5–0. About 23.1 parts by weight of anhydrous ammonia is introduced near the bottom of the bed and throughout substantially the entire length of the bed. The ammonia gas makes its way upward and diffuses through the bed and envelops the granules in the solid rotating bed. Clarified wet process phosphoric acid conveyed from the scrubber system is sprayed downwards on top of the rotating horizontally moving bed and covers the surfaces of the granules with liquid films. The established bed is maintained by a recycle feed of approximately 19–49–0 ($N-P_2O_5$) and of approximately 3:1 with respect to the product and furnishes the surface area for the exposure of the acid which forms thin films around the nuclei particles. Thin films of approximately 19–49–0 ($N-P_2O_5$) are successively built up around the nuclei particles to form a final product. As the granules roll around in contact with other granules, they are rounded and form finished round granules useful for final product or recycle feed. About 400 parts by weight of product are discharged from the reactor as rounded granules containing approximately 19–49–0 ($N-P_2O_5$). Approximately twenty-five percent (25%) of the discharge of rounded granules from the reactor comprising mainly particles of minus 6 mesh plus 12 mesh (Standard Tyler Screens) is removed from the system as the final fertilizer product. In other words, about 100 parts by weight of final product are removed.

During the operation of neutralizing the clarified wet process phosphoric acid with the anhydrous ammonia, the solid bed of particles are in contact wih each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of di-ammonium phosphate having an analysis of approximately 19–49–0 ($N-P_2O_5$).

Clarified wet process phosphoric acid from the scrubber containing some nitrogen is sprayed substantially all over the top of the solid bed of contacting particles. Water is being continually added as clarified wet process phosphoric acid contains water. However, water is also being continually driven off in the form of vapor and/or steam at about 212° F. at atmospheric pressure by the head of reaction from the solid bed rotating within the reactor. The air introduced through the system may or may not be heated. For start-up, the air should preferably be heated. Likewise, when the relative humidity is high, the air should preferably be heated. In cases where there is more water to be driven off than the heat of reaction can take care of, the air should be heated. The clarified wet process phosphoric acid having a concentration of about 38.0% $P_2O_5$ and ammonia are controlled by metering in stoichiometric quantities or amounts to produce di-ammonium phosphate analyzing 19–49–0 ($N-P_2O_5$). The efficiency of the reactor is somewhere between 75% to 85%, so the scrubber phosphoric acid recaptures the 15% to 25% excess ammonia. Such recaptured ammonia is returned to the reactor combined with the clarified wet process phosphoric acid from the scrubber. In the present example, this recaptured or absorbed ammonia constitutes about 5.8 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the acid or decreasing the concentration of the acid or stoppage of acid sprays or stoppage of ammonia sparger, etc.

EXAMPLE NO. 10

For the production of a fertilizer preferably containing granular ammonium phosphate containing a relatively high percentage of $P_2O_5$ in accordance with the present invention, the following operations have been employed. Substantially dry, solid ammonium phosphate approximating 12.5–53–0 ($N-P_2O_5$) and granulated to a substantially spherical form and constituted of substantially uniform granules was used as the solid bed in the rotating reactor or drum. These granules analyzed approximately 12.5–53–0 ($N-P_2O_5$) and contained sizes comprising about minus 6 mesh through about plus 60 mesh. By so doing, a solid bed is established as a substantially moving horizontal rotating mass which moves from the open inlet of said drum to the outlet thereof. For practical purposes, especially of an industrial character, the depth of the bed should preferably not be less than about one-half of one foot but may be of the order of several feet, depending on the diameter of the rotary drum. The bulk, or major portion of the recycle feed of 300 parts by weight is composed chiefly of about minus 6 mesh to about plus 20 mesh granules with a remainder of minus 20 mesh through minus 60 mesh. When the solid bed is established, about 98 parts by weight of clarified wet process phosphoric acid containing approximately 54% $P_2O_5$ is recirculated through the scrubbing system. Sufficient air is introduced through the inlet of the reactor or rotary drum to carry away the moisture, excess ammonia, and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 1.01 pounds, whereas when a preferred temperature of 170° F. prevails in the outgoing air carrying the ammonia and other gases and vapors, then the minimum quantity should be about 0.32 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where clarified wet process phosphoric acid absorbs excess ammonia present in said gases and vapors to the extent of about 3.1 parts by weight. In the scrubber, the phosphoric acid is partially neutralized by the ammonia and the partially neutralized acid leaving the scrubber has an $N-P_2O_5$ composition of approximately 3.1–55–0. About 15.2 parts by weight of anhydrous ammonia is introduced near the bottom of the bed and throughout substantially the entire length of the bed. The ammonia gas makes its way upward and diffuses through the bed and envelopes the granules in the solid rotating bed. Clarified wet process phosphoric acid conveyed from the scrubber system is sprayed downwards on top of the rotating horizontally moving bed and covers the surfaces of the granules with liquid films. The established bed is maintained by a recycle feed of approximately 12.5–53–0 ($N-P_2O_5$) and of approximately 3:1 with respect to the product and furnishes the surface area for the exposure of the acid which forms thin films around the nuclei particles. Thin films of approximately 12.5–53–0 ($N-P_2O_5$) are successively built up around the nuclei particles to form a final product. As the granules roll around in contact with other granules, they are rounded and form finished round granules useful for final product or recycle feed. About 400 parts by weight of product are discharged from the reactor as rounded granules containing approximately 12.5–53–0 ($N-P_2O_5$). Approximately twenty-five percent (25%) of the discharge of rounded granules from the reactor comprising mainly particles of minus 6 mesh plus 12 mesh (Standard Tyler Screens) is removed from the system as the final fertilizer product. In other words, about 100 parts by weight of final product are removed.

During the operation of neutralizing the clarified wet process phosphoric acid with the anhydrous ammonia, the solid bed of particles are in contact with each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of ammonium phosphate having an analysis of approximately 12.5–53–0 ($N-P_2O_5$).

Clarified wet process phosphoric acid from the scrubber containing some nitrogen is sprayed substantially all over the top of the solid bed of contacting particles. Water is being continually added as clarified wet process phosphoric acid contains water. However, water is also being continually driven off in the form of vapor and/or steam at about 212° F. at atmospheric pressure by the heat of reaction from the solid bed rotating within the reactor. The air introduced through the system may or may not be heated. For start-up, the air should preferably be heated. Likewise, when the relative humidity is high, the air should preferably be heated. In cases where there is more water to be driven off than the heat of reaction can take care of, the air should be heated. The clarified wet process phosphoric acid having a concentration of about 54.0% $P_2O_5$ and ammonia are controlled by metering in stoichiometric quantities or amounts to produce ammonium phosphate analyzing 12.5–53–0 ($N-P_2O_5$). The efficiency of the reactor is somewhere between 75% to 85%, so the scrubber phosphoric acid recaptures the 15% to 25% excess ammonia. Such recaptured ammonia is returned to the reactor combined with the clarified wet process phosphoric acid from the scrubber. In the present example, this recaptured or absorbed ammonia constitutes about 3.1 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the acid or decreasing the concentration of the acid or stoppage of acid sprays, or stoppage of ammonia sparger, etc.

EXAMPLE NO. 11

For the production of a fertilizer preferably containing granular ammonium phosphate containing a relatively high percentage of $P_2O_5$ in accordance with the present invention, the following operations have been employed.

Substantially dry, solid ammonium phosphate granulated to a substantially spherical form and constituted of substantially uniform granules was used as the solid bed in the rotating reactor or drum. These granules analyzed approximately 12–54–0 (N-$P_2O_5$) and contained sizes comprising about minus 6 mesh through about plus 60 mesh. By so doing, a solid bed is established as a substantially moving horizontal rotating mass which moves from the open inlet of said drum to the outlet thereof. For practical purposes, especially of an industrial character, the depth of the bed should preferably not be less than about one-half of one foot, but may be of the order of several feet, depending on the diameter of the rotary drum. The bulk or major portion of the recycle feed of 300 parts by weight is composed chiefly of about minus 6 mesh to about plus 20 mesh granules with a remainder of minus 20 mesh through minus 60 mesh. When the solid bed is established about 104 parts by weight of clarified wet process phosphoric acid containing approximately 52% $P_2O_5$ is recirculated through the scrubbing system. Sufficient air is introduced through the inlet of the reactor or rotary drum to carry away the moisture, excess ammonia and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 2.19 pounds, whereas when a preferred temperature of 170° F. prevails in the outgoing air carrying the ammonia and other gases and vapors, then the minimum quantity should be about 0.70 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where clarified wet process phosphoric acid absorbs excess ammonia present in said gases and vapors to the extent of about 3.6 parts by weight. In the scrubber, the phosphoric acid is partially neutralized by the ammonia and the partially neutralized acid leaving the scrubber has an N-$P_2O_5$ composition of approximately 3.6–53.5–0. About 14.6 parts by weight of anhydrous ammonia is introduced near the bottom of the bed and throughout substantially the entire length of the bed. The ammonia gas makes its way upward and diffuses through the bed and envelops the granules in the solid rotating bed. Clarified wet process phosphoric acid conveyed from the scrubber system is sprayed downwards on top of the rotating horizontally moving bed and covers the surfaces of the granules with liquid films. The established bed is maintained by a recycle feed of approximately 12–54–0 (N-$P_2O_5$) and of approximately 3:1 with respect to the product and furnishes the surface area for the exposure of the acid which forms thin films around the nuclei particles. Thin films of approximately 12–54–0 (N-$P_2O_5$) are successively built up around the nuclei particles to form a final product. As the granules roll around in contact with other granules, they are rounded and form finished round granules useful for final product or recycle feed. About 400 parts by weight of product are discharged from the reactor as rounded granules containing approximately 12–54–0 (N-$P_2O_5$). Approximately twenty-five percent (25%) of the discharge of rounded granules from the reactor comprising mainly particles of minus 6 mesh plus 12 mesh (Standard Tyler Screens) is removed from the system as the final fertilizer product. In other words, about 100 parts by weight of final product are removed.

During the operation of neutralizing the clarified wet process phosphoric acid with the anhydrous ammonia, the solid bed of particles are in contact with each other and the particles are given a forward rolling movement by the action of the reactor or the rotary drum. The forward movement carried the material in the reactor to the discharge or outlet end of the reactor. The rolling movement of the particles in contact with each other rounds off the particles built up with successive layers of ammonium phosphate having an analysis of approximately 12–54–0 (N-$P_2O_5$).

Clarified wet process phosphoric acid from the scrubber containing some nitrogen is sprayed substantially all over the top of the solid bed of contacting particles. Water is being continually added as clarified wet process phosphoric acid contains water. However, water is also being continually driven off in the form of vapor and/or steam at about 212° F. at atmospheric pressure by the heat of reaction from the solid bed rotating within the reactor. The air introduced through the system may or may not be heated. For start-up, the air should preferably be heated. Likewise, when the relative humidity is high, the air should preferably be heated. In cases where there is more water to be driven off than the heat of reaction can take care of, the air should be heated. The wet process clarified phosphoric acid having a concentration of about 52% $P_2O_5$ and ammonia are controlled by metering in stoichiometric quantities or amounts to produce ammonium phosphate analyzing 12–54–0 (N-$P_2O_5$). The efficiency of the reactor is somewhere between 75% to 85%, so the scrubber phosphoric acid recaptures the 15% to 25% excess ammonia. Such recaptured ammonia is returned to the reactor combined with the clarified wet process phosphoric acid from the scrubber. In the present example, this recaptured or absorbed ammonia constitutes about 3.6 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the acid or decreasing the concentration of the acid or stoppage of acid sprays, or stoppage of ammonia sparger, etc.

EXAMPLE NO. 12

For the production of a fertilizer preferably containing granular di-ammonium phosphate having an approximate analysis of 21–53–0 (N-$P_2O_5$) and an actual analysis of 21.1–53.5–0 (N-$P_2O_5$) in accordance with the present invention, the following operations have been employed. Substantially dry, solid di-ammonium phosphate approximating 21–53–0 (N-$P_2O_5$) and granulated to a substantially spherical form and constituted of substantially uniform granules was used as the solid bed in the rotating reactor or drum. These granules contained sizes comprising about minus 6 mesh through about plus 60 mesh. By so doing, a solid bed is established as a substantially moving horizontal rotating mass which moves from the open inlet of said drum to the open outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed of about 300 parts by weight is composed chiefly of about minus 6 mesh to about plus 20 mesh granules with a remainder of minus 20 mesh through minus 60 mesh. When the solid bed is established about 136 parts by weight of commercially pure phosphoric acid or electric furnace phosphoric acid containing about 39% $P_2O_5$ are recirculated through the scrubbing system. Sufficient air is introduced through the inlet of the reactor or rotary drum to carry away the moisture, excess ammonia, and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 4.71 pounds, whereas when a preferred temperature of 170° prevails in the outgoing air carrying the ammonia and other gases and vapors, then the minimum quantity should be about 1.38 pounds. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where pure commercial liquid phosphoric acid or electric furnace phosphoric acid absorbs excess ammonia present in said gases and vapors to the extent of about 6.4 parts by weight. In the scrubber, the phosphoric acid is partially neutralized by the ammonia and the partially neutralized acid leaving the scrubber has an $N-P_2O_5$ composition of approximately 5.5–41–0. About 25.5 parts by weight of anhydrous ammonia are introduced near the bottom of the bed and throughout substantially the entire length of the bed. The ammonia gas makes its way upward and diffuses through the bed and envelops the granules in the solid rotating bed. Phosphoric acid conveyed from the scrubber system and containing absorbed ammonia is sprayed downwards on top of the rotating horizontal moving bed and covers the surfaces of the granules with liquid films. The established bed is maintained by a recycle feed of approximately 3:1 with respect to the final product and furnishes the surface area for the exposure of the acid which forms thin films around the nuclei particles. Thin films of approximately 21–53–0 ($N-P_2O_5$) are successively built up around the nuclei particles to form a final product. As the granules roll around in contact with each other, they are rounded and form finished rounded granules useful as the final product or as recycle feed. About 400 parts by weight of product are discharged from the reactor as rounded granules containing approximately 21–53–0 ($N-P_2O_5$). Approximately twenty-five percent (25%) of the discharge of rounded granules from the reactor comprising mainly particles of minus 6 mesh plus 12 mesh (Standard Tyler Screens) is removed from the system as fertilizer products. In other words, about 100 parts by weight are removed.

During the operation of neutralizing the phosphoric acid with the anhydrous ammonia, the solid bed of particles are in contact with each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of di-ammonium phosphate having an analysis of approximately 21–53–0 ($N-P_2O_5$).

Phosphoric acid from the scrubber containing some nitrogen is sprayed substantially all over the top of the solid bed of contacting particles. Water is being continually added as the commercially pure phosphoric acid contains water. However, water is also being continually driven off in the form of vapor and/or steam at about 212° F. at atmospheric pressure by the heat for reaction from the solid bed rotating within the reactor. The air introduced through the system may or may not be heated. For start-up, the air should preferably be heated. Likewise, when the relative humidity is high, the air should preferably be heated. In cases where there is more water to be driven off than the heat of reaction can take care of, the air should be heated. The commercially pure phosphoric acid having a concentration of about 39.0% $P_2O_5$ and ammonia are controlled by metering in stoichiometric quantities or amounts to produce di-ammonium phosphate analyzing 21–53–0 ($N-P_2O_5$). The efficiency of the reactor is somewhere between 75% to 85%, so the commercially pure phosphoric acid used in the scrubber recaptures the 15% to 25% excess ammonia. Such recaptured ammonia is returned to the reactor combined with the commercially pure phosphoric acid from the scrubber. In the present example, this recaptured or absorbed ammonia constitutes about 6.4 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the commercially pure phosphoric acid or decreasing the concentration of the said acid or stoppage of acid sprays, or stoppage of ammonia sparger, etc.

EXAMPLE NO. 13

For the production of a fertilizer preferably containing granular di-ammonium phosphate having an approximate analysis of 18–56–0 ($N-P_2O_5$) and an actual analysis of 18–56.10–0 ($N-P_2O_5$) in accordance with the present invention, the following operations have been employed. Substantially dry, solid di-ammonium phosphate approximating 18–56–0 ($N-P_2O_5$) and granulated to a substantially spherical form and constituted of substantially uniform granules was used as the solid bed in the rotating reactor or drum. These granules contained sizes comprising about minus 6 mesh through about plus 60 mesh. By so doing, a solid bed is established as a substantially moving horizontal rotating mass which moves from the open inlet of said drum to the open outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed of about 300 parts by weight is composed chiefly of about minus 6 mesh to about plus 20 mesh granules with a remainder of minus 20 mesh through minus 60 mesh. When the solid bed is established about 117 parts by weight of commercially pure phosphoric acid or electric furnace phosphoric acid containing about 48% $P_2O_5$ are recirculated through the scrubbing system. Sufficient air is introduced through the inlet of the reactor or rotary drum to carry away the moisture, excess amonia, and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 2.98 pounds, whereas when a preferred temperature of 170° F. prevails in the outgoing air carrying the ammonia and other gases and vapors, then the minimum quantity should be about 0.87 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where commercially pure liquid phosphoric acid absorbs excess ammonia present in said gases and vapors to the extent of about 5.5 parts by weight. In the scrubber, the phosphoric acid is partially neutralized by the ammonia and the partially neutralized acid leaving the scrubber has an $N-P_2O_5$ composition of approximately 4.7–49.5–0. About 22 parts by weight of anhydrous ammonia are introduced near the bottom of the bed and throughout substantially the entire length of the bed. The ammonia gas makes its way upward and diffuses through the bed and envelops the granules in the solid rotating bed. Phosphoric acid conveyed from the scrubber system and containing absorbed ammonia is sprayed downwards on top of the rotating horizontally moving bed and covers the surfaces of the granules with liquid films. The established bed is maintained by a recycle feed of approximately 3:1 with respect to the final product and furnishes the surface area for the exposure of the acid which forms thin films around the nuclei particles. Thin films of approximately 18–56–0 ($N-P_2O_5$) are sucessively built up around the nuclei particles to form a final product. As the granules roll around in contact with each other, they are rounded and form finished rounded granules useful as the final product or as recycle feed. About 400 parts by weight of product are discharged from the reactor as rounded granules containing approximately 18–56–0 ($N-P_2O_5$). Approximately twenty-five percent (25%) of the discharge of rounded granules from the reactor comprising mainly particles of minus 6 mesh plus 12 mesh (Standard Tyler Screens) is removed from the system as fertilizer products. In other words, about 100 parts by weight are removed.

During the operation of neutralizing the phosphoric acid with the anhydrous ammonia, the solid bed of particles are in contact with each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of di-ammonium phosphate having an analysis of approximately 18–56–0 ($N-P_2O_5$).

Phosphoric acid from the scrubber containing some nitrogen is sprayed substantially all over the top of the solid bed of contacting particles. Water is being continually added as the commercially pure phosphoric acid contains water. However, water is also being continually driven off in the form of vapor and/or steam at about 212° F. at atmospheric pressure by the heat of reaction from the solid bed within the reactor. The air introduced through the system may or may not be heated. For start-up, the air should preferably be heated. Likewise, when the relative humidity is high, the air should preferably be heated. In cases where there is more water to be driven off than the heat of reaction can take care of, the air should be heated. The commercially pure phosphoric acid having a concentration of about 48% $P_2O_5$ and ammonia are controlled by metering in stoichiometric quantities or amounts to produce di-ammonium phosphate analyzing 18–56–0 ($N-P_2O_5$). The efficiency of the reactor is somewhere between 75% to 85% so the commercially pure phosphoric acid used in the scrubber recaptures the 15% to 25% excess ammonia. Such recaptured ammonia is returned to the reactor combined with the commercially pure phosphoric acid from the scrubber. In the present example, this recaptured or absorbed ammonia constituted about 5.5 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the commercially pure phosphoric acid or decreasing the concentration of the said acid or stoppage of acid sprays, or stoppage of ammonia sparger, etc.

EXAMPLE NO. 14

For the production of a fertilizer preferably containing granular di-ammonium phosphate having an approximate analysis of 16.5–58–0 ($N-P_2O_5$) and an actual analysis of 16.57–58.45–0 ($N-P_2O_5$) in accordance with the present invention, the following operations have been employed. Substantially dry, solid di-ammonium phosphate approximating 16.5–58–0 ($N-P_2O_5$) and granulated to a substantially spherical form and constituted of substantially uniform granules was used as the solid bed in the rotating reactor or drum. These granules contained sizes comprising about minus 6 mesh through about plus 60 mesh. By so doing, a solid bed is established as a substantially moving horizontal rotating mass which moves from the open inlet of said drum to the open outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed of about 300 parts by weight is composed chiefly of about minus 6 mesh to about plus 20 mesh granules with a remainder of minus 20 mesh through minus 60 mesh. When the solid bed is established about 118 parts by weight of commercially pure phosphoric acid or electric furnace phosphoric acid containing about 49% $P_2O_5$ are recirculated through the scrubbing system. Sufficient air is introduced through the inlet of the reactor or rotary drum to carry away the moisture, excess ammonia, and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F., the minimum amount of air entering the inlet should be about 2.91 pounds, whereas when a preferred temperature of 170° F. prevails in the outgoing air carrying the ammonia and other gases and vapors, then the minimum quantity should be about 0.85 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where commercially pure liquid phosphoric acid absorbs excess ammonia present in said gases and vapors to the extent of about 5 parts by weight. In the scrubber, the phosphoric acid is partially neutralized by the ammonia and the partially neutralized acid leaving the scrubber has an $N-P_2O_5$ composition of approximately 4.2–50.5–0. About 20 parts by weight of anhydrous ammonia are introduced near the bottom of the bed and throughout substantially the entire length of the bed. The ammonia gas makes its way upward and diffuses through the bed and envelops the granules in the solid rotating bed. Phosphoric acid conveyed from the scrubber system and containing absorbed ammonia is sprayed downwards on top of the rotating horizontally moving bed and covers the surfaces of the granules with liquid films. The established bed is maintained by a recycle feed of approximately 3:1 with respect to the product and furnishes the surface area for the exposure of the acid which forms thin films around the nuclei particles. Thin films of approximately 16.5–58–0 ($N-P_2O_5$) are successively built up around the nuclei particles to form a final product. As the granules roll around in contact with each other, they are rounded and form finished rounded granules useful as the final product or as recycle feed. About 400 parts by weight of product are discharged from the reactor as rounded granules containing approximately 16.5–58–0 ($N-P_2O_5$). Approximately twenty-five percent (25%) of the discharge of rounded granules from the reactor comprising mainly particles of minus 6 mesh plus 12 mesh (Standard Tyler Screens) is removed from the system as fertilizer products. In other words, about 100 parts by weight are removed.

During the operation of neutralizing the phosphoric acid with the anhydrous ammonia, the solid bed of particles are in contact with each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of di-ammonium phosphate having an analysis of approximately 16.5–58–0 ($N-P_2O_5$).

Phosphoric acid from the scrubber containing some nitrogen is sprayed substantially all over the top of the solid bed of contacting particles. Water is being continually added as the commercially pure phosphoric acid contains water. However, water is also being continually driven off in the form of vapor and/or steam at about 212° F. at atmospheric pressure by the heat of reaction from the solid bed rotating within the reactor. The air introduced through the system may or may not be heated. For start-up, the air should preferably be heated. Likewise, when the relative humidity is high, the air should preferably be heated. In cases where there is more water to be driven off than the heat of reaction can take care of, the air should be heated. The commercially pure phosphoric acid or electric furnace phosphoric acid having a concentration of about 49% $P_2O_5$ and ammonia are controlled by metering in stoichiometric quantities or amounts to produce di-ammonium phosphate analyzing 16.5–58–0 ($N-P_2O_5$). The efficiency of the reactor is somewhere between 75% to 85%, so the commercially pure phosphoric acid used in the scrubber recaptures the 15% to 25% excess ammonia. Such recaptured ammonia is returned to the reactor combined with the commercially pure phosphoric acid from the scrubber. In the present example, this recaptured or absorbed ammonia constitutes about 5 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the commercially pure phosphoric acid or decreasing the concentration of the said acid or stoppage of acid sprays, or stoppage of ammonia sparger, etc.

EXAMPLE NO. 15

For the production of a fertilizer preferably containing granular ammonium phosphate having an approximate analysis of 13–59–0 ($N-P_2O_5$) and an actual analysis of 13.37–59.60–0 ($N-P_2O_5$) in accordance with the present invention, the following operations have been employed. Substantially dry, solid ammonium phosphate approximating 13–59–0 ($N-P_2O_5$) and granulated to a substantially dry, solid ammonium phosphate approximating 13–59–0 ($N-P_2O_5$) and granulated to a substantially spherical form and constituted of substantially uniform granules was used as the solid bed in the rotating reactor or drum. These granules contained sizes comprising about minus 6 mesh through about plus 60 mesh. By so doing, a solid bed is established as a substantially moving horizontal rotating mass which moves from the open inlet of said drum to the open outlet thereof. For practical purposes, especially of an industrial character, the depth of the bed should preferably not be less than about 6 or 7 inches, but may be of the order of several feet, depending on the diameter of the rotary drum. The bulk or major portion of the recycle feed of about 300 parts by weight is composed chiefly of about minus 6 mesh to about plus 20 mesh granules with a remainder of minus 20 mesh through minus 60 mesh. When the solid bed is established, about 114 parts by weight of commercially pure phosphoric acid or electric furnace phosphoric acid containing about 52% $P_2O_5$ are recirculated through the scrubbing system. Sufficient air is introduced through the inlet of the reactor or rotary drum to carry away the moisture excess ammonia, and other gases and vapors. The quantity of air used must be supplied to hold and carry away the water vapor evaporated from the bed in the reactor. Such quantity of air will naturally be dependent upon the temperature of the gases leaving the reactor. The minimum quantity of air which can be supplied to the reactor per pound of product produced depends upon the exit temperature of the air and is given hereinafter for 140° F. and 170° F. This minimum quantity is based upon an assumption that the initial humidity of the air corresponds to saturation at 80° F. When the temperature of the air carrying the ammonia and other gases and vapors at the outlet of the reactor is about 140° F. the minimum amount of air entering the inlet should be about 3.05 pounds, whereas when a preferred temperature of 170° F. prevails in the outgoing air carrying the ammonia and other gases and vapors, then the minimum quantity should be about 0.89 pound. In actual practice, however, an excess of air is always preferably used to provide a driving force to facilitate ready evaporation of the water from the phosphate granules in the bed in the reactor. These gases and vapors carried in the air with ammonia are conveyed to the scrubber system, where commercially pure liquid phosphoric acid absorbs excess ammonia present in said gases and vapors to the extent of about 4 parts by weight. In the scrubber, the phosphoric acid is partially neutralized by the ammonia and the partially neutralized acid leaving the scrubber has an $N-P_2O_5$ composition of approximately 3.5–53.5–0. About 15.8 parts by weight of anhydrous ammonia are introduced near the bottom of the bed and throughout susbtantially the entire length of the bed. The ammonia gas makes its way upward and diffuses through the bed and envelops the granules in the solid rotating bed. Phosphoric acid conveyed from the scrubber system and containing absorbed ammonia is sprayed downwards on top of the rotating horizontally moving bed and covers the surfaces of the granules with liquid films. The estabished bed is maintained by a recycle feed of approximately 3:1 with respect to the final product and furnishes the surface area for the exposure of the acid which forms thin films around the nuclei particles. Thin films of approximately 13–59–0 ($N-P_2O_5$) are successively built up around the nuclei particles to form a final product. As the granules roll around in contact with each other, they are rounded and form finished rounded granules useful as the final product or as recycle feed. About 400 parts by weight of product are discharged from the reactor as rounded granules containing approximately 13–59–0 ($N-P_2O_5$). Approximately twenty-five percent (25%) of the discharge of rounded granules from the reactor comprising mainly particles of minus 6 mesh plus 12 mesh (Standard Tyler Screens) is removed from the system as fertilizer products. In other words, about 100 parts by weight are removed.

During the operation of neutralizing the phosphoric acid with the anhydrous ammonia, the solid bed of particles are in contact with each other and the particles are given a forward rolling movement by the action of the reactor or the rotary drum. The forward movement carries the material in the reactor to the discharge or outlet end of the reactor. The rolling movement of the particles in contact with each other rounds off the particles built up with successive layers of ammonium phosphate having an analysis of approximately 13–59–0 ($N-P_2O_5$).

Phosphoric acid from the scrubber containing some nitrogen is sprayed substantially all over the top of the solid bed of contacting particles. Water is being continually added as the commercially pure phosphoric acid contains water. However, water is also being continually driven off in the form of vapor and/or steam at about 212° F. at atmospheric pressure by the heat of reaction from the solid bed rotating within the reactor. The air introduced through the system may or may not be heated. For start-up, the air should preferably be heated. Likewise, when the relative humidity is high, the air should preferably be heated. In cases where there is more water to be driven off than the heat of reaction can take care of, the air should be heated. The commercially pure phosphoric acid or electric furnace phosphoric acid having a concentration of about 52% $P_2O_5$ and ammonia are controlled by metering in stoichiometric quantities or amounts to produce ammonium phosphate analyzing 13–59–0 ($N-P_2O_5$). The efficiency of the reactor is somewhere between 75% to 85%, so the pure phosphoric acid used in the scrubber recaptures the 15% to 25% excess ammonia. Such recaptured ammonia is returned to the reactor combined with the commercially pure phosphoric acid from the scrubber. In the present example, this recaptured or absorbed ammonia constitutes about 4 parts by weight.

The rounded granular product from the reactor goes to a set of screens where the desired or final product (minus 6 mesh through plus 12 mesh) is removed. The plus 6 mesh and other oversize go to a milling or grinding system to be ground to about minus 6 mesh through about minus 60. The desired or final product removed is approximately 25% of the weight of the entire product discharged from the reactor. The remainder of the product, including the milled or ground portion, is recycled back to the reactor.

In conducting the foregoing operations, the excess ammonia is controlled by a ratio test described heretofore.

The foregoing amounts, mesh, sizes, etc., set forth hereinbefore are for making a rounded granular product comprising principally minus 6 mesh through plus 12 mesh. However, screens and milling or grinding can be used and controlled to produce any desired size or selected granular product suitable to and acceptable by the trade. The rotary reactor is open at the inlet or feed end which enables the operator to observe the condition and action of the solid, rotating bed. Observation is necessary and desirable for good operation and the control of things to be done, such as increasing the concentration of the commercially pure phosphoric acid or decreasing the concentration of the said acid or stoppage of acid sprays, or stoppage of ammonia sparger, etc.

It will be observed that the composition of the fertilizer containing ammonium phosphates in the following schedule ranges from approximately 12–50–0 ($N-P_2O_5$) to approximately 21–53–0 ($N-P_2O_5$) and the ratio of $N-P_2O_5$ varies from about one to two and one-half to one to about four and one-half.

SCHEDULE I

| Percent $N_2$ | Percent $P_2O_5$ | Ratio $N-P_2O_5$ |
|---|---|---|
| 12.00 | 54.00 | 1:4.50 |
| 12.00 | 52.00 | 1:4.33 |
| 12.50 | 53.00 | 1:4.24 |
| 13.00 | 59.00 | 1:4.54 |
| 14.00 | 50.00 | 1:3.57 |
| 14.50 | 49.00 | 1:3.38 |
| 15.50 | 50.00 | 1:3.23 |
| 16.50 | 58.00 | 1:3.51 |
| 16.75 | 49.00 | 1:2.93 |
| 17.00 | 48.00 | 1:2.82 |
| 18.00 | 56.00 | 1:3.11 |
| 18.00 | 47.00 | 1:2.61 |
| 19.00 | 49.00 | 1:2.58 |
| 21.00 | 53.00 | 1:2.52 |

In carrying the present invention into practice to make fertilizers containing rounded, granular ammonium phosphates having the foregoing compositions, the raw materials listed in the following schedule may be used:

proper control with wet process phosphoric acid and other phosphoric acids is exercised by using the ratio test

SCHEDULE II

| Agent | Concentration Broad Range | Percent by Weight | |
|---|---|---|---|
| | | Preferred Range | Best Figure |
| Anhydrous Ammonia | 100% | 100% | 100%. |
| Aqueous Ammonia | 30% and above | 30% and above | 30% and above. |
| Phosphoric Acid: | | | |
| Type: Wet Process Non-Purified Acid. | Depending on the product made. Generally about 20% $P_2O_5$ to about 60% $P_2O_5$. | ($P_2O_5$) 30% to 55% | ($P_2O_5$) 39% to 52%. |
| Type: Wet Process Clarified Acid. | do | ($P_2O_5$) 30% to 55% | ($P_2O_5$) 39% to 52%. |
| Type: Commercially Pure Acid. | do | ($P_2O_5$) 30% to 55% | ($P_2O_5$) 39% to 52%. |

For the purpose of assisting those skilled in the art in carrying the present process into practice, the following conditions involved in the process may be used:

control described hereinbefore. pH tests of the scrubbing acid may also be used as a good means of control.

For any given type of phosphoric acid (wet process,

SCHEDULE III

| Item | Broad Range | Preferred Range | Best Figure |
|---|---|---|---|
| Depth of Bed | One-half of one foot to several feet | Function of design of equipment | Function of design of equipment. |
| Mesh of Feed | −6 mesh through −60 mesh | Substantially −6 mesh through +60 mesh. | Depending on product desired by trade generally. |
| Pressure | Atmospheric | Atmospheric | Atmospheric. |
| pH | Function of the product. Approximate range 5.5 to 8.5. | Function of the product. Approximate range 5.5 to 8.5. | Function of the product. Approximate range 5.5 to 8.5. |
| Excess Ammonia | Above 5% | 5% to 50% | 20% to 30%. |
| $H_2O$ | 1% to 8% | 1% to 3% | 1% to 2% |
| Ratio of Burette Readings | Function of product. Approximately 2.00 to 4.00 for ammonium phosphates. | Function of product. Approximately 2.00 to 4.00 for ammonium phosphates. | Function of product. Approximately 2.00 to 4.00 for ammonium phosphates. |
| Recycle | 2:1 to 10:1 | 2.5:1 to 4:1 | 3:1. |
| Mesh of Product | Depending on product desired by trade. | Depending on product desired by the trade | Depending on product desired by the trade. |
| Fraction of Product Withdrawn. | Depending on recycle. Generally about 10% to about 35%. | 15% to 30% | 3:1 would be 25%. |

The following are illustrations of recycle feed which function satisfactorily in a large industrial plant, say of 100,000 tons annual capacity. Such a plant will produce about 300 tons per 24 hours of a fertilizer containing rounded granular di-ammonium phosphate analyzing approximately 18–46–0 (N-$P_2O_5$):

SCHEDULE IV

| −6 mesh | +12 mesh | +12 mesh | +20 mesh | +60 mesh | −60 mesh |
|---|---|---|---|---|---|
| 100% | 57.2% | 75.3% | 95.3% | 99.3% | 0.7% |
| 100% | 34.8% | 70.3% | 94.3% | 99.0% | 1.0% |
| 100% | 19.5% | 48.3% | 90.3% | 99.4% | 0.6% |
| 100% | 24.5% | 54.4% | 93.2% | 99.0% | 1.0% |
| 100% | 44.2% | 69.7% | 94.2% | 99.2% | 0.8% |

These recycle feed mesh ranges are applicable to all of the illustrative examples, using the same screens and milling equipment, for producing a product of minus 6 mesh through plus 12 mesh (Tyler Standard Screens). The screens can be altered and the milling controlled to produce any size granular product suitable to or desired by the trade. The recycle feed (approximately three times as much as the final product removed from the system) is the preferred recycle.

The pH of the product is a measure of its relative grade. With a given acid, the lower the pH the higher the $P_2O_5$ content, and the lower the nitrogen content of the product. The following are pH's of some of the illustrative products.

SCHEDULE V

| N-$P_2O_5$: | pH |
|---|---|
| 12–52–0 | 5.6 |
| 13–59–0 | 5.8 |
| 14–50–0 | 6.5 |
| 16.5–58–0 | 6.6 |
| 17–48–0 | 7.3 |
| 18–47–0 | 7.7 |
| 19–49–0 | 7.9 |
| 21–53–0 | 8.3 |

The pH gives an approximate assay of grade, but it does not show the amount of excess ammonia being used. The concentration increases, the ratio of nitrogen to $P_2O_5$ in the product decreases.

It is to be noted that the foregoing description including the numerous illustrative examples make it clear that certain variations and modifications may be used in carrying the invention into practice. For the benefit of those skilled in the art, the following generalizations will be given regarding various aspects of the invention.

With respect to the depth of the bed, it is to be emphasized that it is a function of the diameter of the reactor or rotary drum. Bed depths from about 6 inches or 7 inches to about 45 inches or 48 inches have been successfully operated and have produced satisfactory granules. Deeper or shallower beds could be used, if desired, under suitable conditions.

In regard to the mesh of the recycle feed, it is to be stressed that such mesh is a function of the desired size range in the desired product. In general, the recycle feed should contain no material larger than the largest particle desired in the finished product and the least practical quantity of −20 mesh (Tyler Standard) material.

The temperature of the bed is a function of the physical design of the rotary reactor and the desired operating characteristics. The temperature of the bed must not exceed that at which the ammonium phosphate products decompose which vary depending on the decomposition curves.

electric furnace, etc.) there is a minimum concentration below which the material in the reactor retains excessive moisture. At this level, the use of a dryer is required. The product composition up to and including this minimum will be substantially di-ammonium phosphate. As acid As those skilled in the art understand, there is no sharp threshold temperature for decomposition. This is clearly illustrated in the decomposition curves shown in FIGS. 7 and 8. For example, a 50 gram sample of approximately 18–47–0 (N-P$_2$O$_5$) di-ammonium phosphate was tested for 30 minutes by heating to a temperature over about 300° F. The loss in pounds of nitrogen per ton of di-ammonium phosphate was determined and plotted as the ordinate whereas the temperature was plotted as degrees Fahrenheit in FIG. 7. It will be observed that the loss is at first gradual and then accelerated as the higher temperatures are approached. Below a temperature of about 275° F. the loss of nitrogen for about one-half hour is practically negligible. The maximum loss is about two pounds of nitrogen per ton of product which is approximately equivalent to 0.1% of the entire mass or about 0.5% of nitrogen present. At a temperature of about 300° F., a loss of grade point is reached at about five pounds of nitrogen per ton of di-ammonium phosphate.

A somewhat similar curve is illustrated in FIG. 8. This curve shows the decomposition of pure di-ammonium phosphate. The theoretical decomposition is as follows:

$$(NH_4)_2HPO_4 \rightarrow NH_3 + NH_4H_2PO_4$$

The ordinate of this curve is the dissociation pressure of di-ammonium phosphate expressed in millimeters of mercury whereas the abscissae is the temperature expressed in degrees centigrade. At the lower temperatures, it will be observed that the dissociation pressure is slight. In other words, the loss of ammonia is practically insignificant at the lower temperatures. However, as the temperatures are increased, the dissociation pressure becomes very pronounced, particularly at the elevated temperatures, and the loss of ammonia is substantial.

Due to the dissociation of di-ammonium phosphate, care must be exercised in the operations within the reactor and elevated temperatures must be avoided. It is for this reason that the temperature of the air and/or gases passing through the reactor and over the bed of phosphate is carefully controlled. From practical tests and operations, it has been found that the temperature of the gases leaving the reactor is preferably maintained at about 170° F. However, lower temperatures can be used as long as sufficient air and/or gases (hot products of combustion) are utilized to carry away the moisture or water. Excessively high temperatures, such as 225° F. or the like must be avoided.

The pH of the product is a measure of its relative grade with respect to nitrogen and to P$_2$O$_5$. With a given acid concentration, the lower the pH the higher the P$_2$O$_5$ and the lower the nitrogen content of the final product.

While it is preferred to use untreated or impure wet process phosphoric acid for commercial operations on an industrial scale, nevertheless a clarified wet process phosphoric acid may be used or purer grades of phosphoric acids may be used. The purer the acid, the higher the grade of the resulting product. Thus, Examples 1 through 8 inclusive illustrate the use of untreated wet process acid; Examples 9, 10 and 11 involve the use of clarified wet process acid; and Examples 12 through 15 inclusive illustrate the use of commercially pure acid (furnace grade). For example, the material cited in Example 9 (19–49–0) had a pH of 7.90 while that in Example 10 (12.5–53–0) had a pH of 5.70.

An excess of ammonia is essential to carry the invention into practice and to obtain the new results. The minimum excess will vary with the equipment and method of operation. An excess of approximately 25% has been found optimum for many operations. However, under ideal conditions, this excess may be reduced to the order of 5%. For satisfactory results under industrial practice, an excess of about 10% to about 20% and especially about 15% may be used.

For any given type of acid (wet process phosphoric acid, impure or clarified, or so-called pure phosphoric acid), there is a minimum concentration below which the material in the reactor retains excessive moisture and at concentrations below this level, the use of a dryer is required. The product composition at concentrations up to and including this minimum will be essentially di-ammonium phosphate. As the acid concentration increases, the ratio of nitrogen to P$_2$O$_5$ in the product decreases. In other words, the ratio of nitrogen to P$_2$O$_5$ can be controlled to a value within a range specified herein. Thus, by adjusting the concentrations of phosphoric acid and ammonia the ratio of nitrogen to P$_2$O$_5$ can be controlled to a selected value with the aforesaid ranges.

A rounded granular fertilizer containing di-ammonium phosphate having an approximate analysis of 18–46–0 (N-P$_2$O$_5$) was made in accordance with the present invention on an industrial scale. This granular product satisfied a long-felt want and functioned very satisfactorily when used on a practical scale in farming. Thus, farmers found the granular fertilizer containing substantially uniform granules was a better and superior drillable product when used in conventional farm machinery than prior products. Moreover, the capitalization of a commercial plant to carry into industrial practice the present invention is considerably less than that for prior products made with electric furnace phosphoric acid. Furthermore, the product produced by the present process is cheaper than prior products made with the aforesaid acid. The present commercial product possessed the following physical and chemical properties:

Approximate screen analysis: Percent
    Minus 6–plus 16 mesh _____ 95 to 99
    Minus 16 mesh _____ 1 to 5
Bulk density:
    63 pounds per cubic foot
Angle of repose:
    31° to 33°
Typical chemical analysis:
    Nitrogen _____ 18.20
    Total P$_2$O$_5$ _____ 46.90
    Insoluble P$_2$O$_5$ _____ 0.62
    Available P$_2$O$_5$ _____ 46.28
    Moisture _____ 1.04
    pH _____ 7.6
Water solubility:
    Nitrogen _____ 99.9
    P$_2$O$_5$ _____ 94.6
    Mass _____ 88.0
Typical trace elements:
    Calcium oxide _____ 0.97
    Magnesium oxide _____ 0.31
    Iron and aluminum _____ 3.04
    Manganese _____ 0.10

Fertilizers embodying the ammonium phosphates as heretofore described can be produced from various grades of phosphoric acid including wet process phosphoric acid, as granular, is carefully sized so that about 95% of the granules are in a range of approximately 6–16 mesh. Substantially uniform granules associated with a plant food content that is about 95% water soluble is ideal for direct soil application. Ammonium phosphates made with commercially pure phosphoric acid are practically or substantially 100% water soluble.

The granules embodying said ammonium phosphates are free flowing and will not cake or set-up under normal storage conditions. Since these granules are compatible with other fertilizer materials, they can be mixed with any of such materials and can be economically used for the incorporation of 18 units of nitrogen and 46 units of P$_2$O$_5$ in one ton of material thereby making possible the production of ultra-high analysis fertilizers which cannot be made with conventional materials. In this connection, it is to be noted that the nitrogen is fixed and thus eliminates undesirable losses of ammonia.

For the purpose of giving those skilled in the art a better appreciation of the rounded granular phosphatic particles produced by the present invention, FIGS. 4, 5 and 6 have been included in the drawings illustrating a single granule, a plurality of granules and a pile of granules. These granules are constituted of approximately 18–46–0 ($N-P_2O_5$) di-ammonium phosphate which was made by the novel process. It will be observed from FIG. 4, that the phosphate granule is fairly rounded due to its rotation in the rotary, horizontal moving bed in the reactor and its rubbing against adjacent granules. These granules are generally within a range of approximately 6–16 mesh. In other words, these spherical particles vary in diameter from about 3.3 mm. (0.131 of an inch) and to about 1.0 mm. (0.039 of an inch). The variation in the size of the spheres can be seen in FIG. 5. Due to the spherical shape of the rounded granules, they flow freely and roll or slide on an inclined surface. This flowing and/or rolling or sliding tendency can be clearly observed in FIG. 6. The particles flow or roll down the pile until equilibrium is reached. Generally speaking, the angle of repose of the granules is about 30° to about 33° or 35°.

Figure 9:
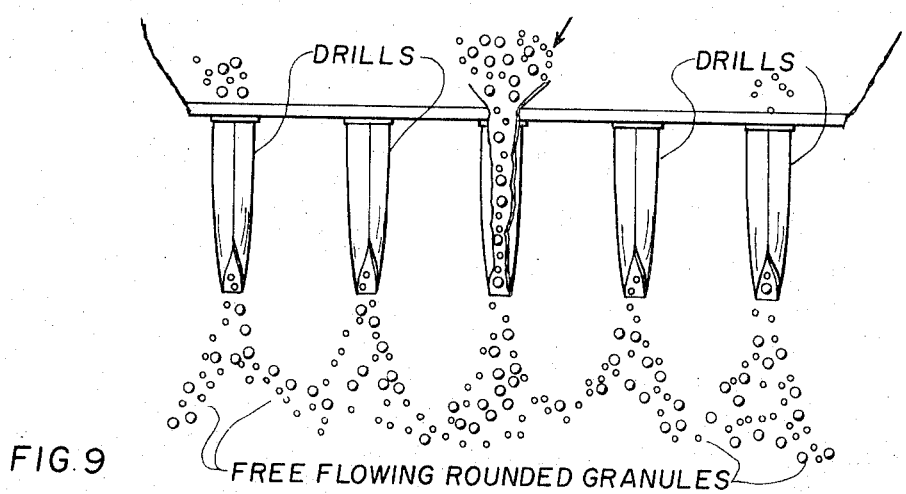
FIG. 9 depicts a fragmentary view of a drilling machine, somewhat diagrammatic with parts broken away, to show the free flow of rounded granules of di-ammonium phosphate made by the present process.
Figure 10:
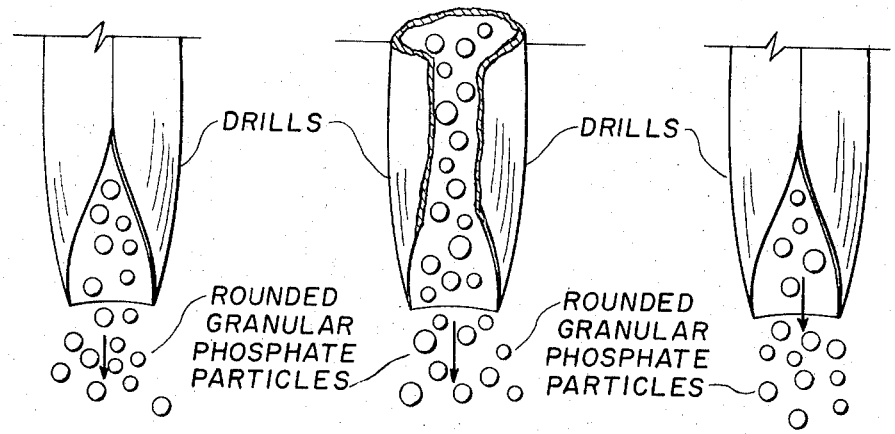
FIG. 10 is another fragmentary view of parts of drillers on an enlarged scale.
Figure 11:
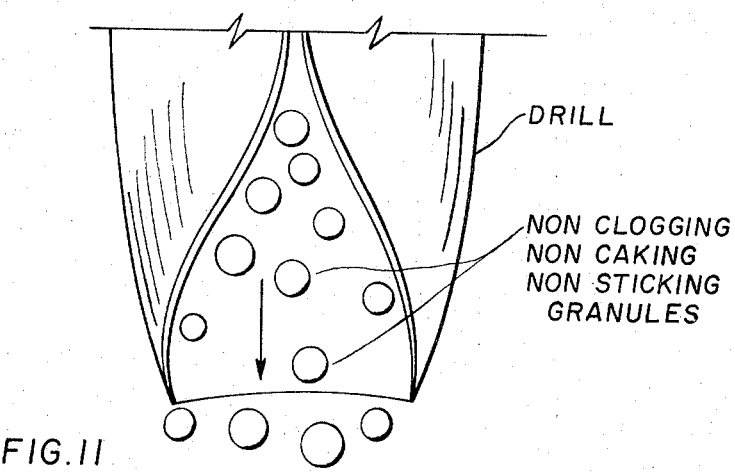
FIG. 11 is still another fragmentary view of a single driller on a greatly enlarged scale to illustrate the free flow of rounded granules.

The free flowing nature of the rounded granules makes them especially useful in drilling machines used on farms. The fertilizer comprising these rounded granules is supplied to a hopper on the drilling machine and is fed to the drills in the usual fashion. By referring to FIGS. 9, 10 and 11, it will be clearly seen that the granules flow freely through the drills of a drilling machine. These drawings were made from photographs taken of the drilling machine when the granules were being discharged by the drills. FIG. 10 is an enlarged fragmentary view of several drills to illustrate that there is no clogging and that the granules are discharged freely. The free flowing nature of the spherical particles is likewise shown in the enlarged fragmentary view in FIG. 11. Actual use on the farms has confirmed the free flowing characteristic of the rounded granules of ammonium phosphates and has produced new, improved and unusual results of a highly beneficial nature.

In the present specification, the word "approximate" is used as the grade of ammonium phosphate which will vary depending on the amounts of phosphoric acid and ammonia, the concentrations thereof, the temperatures, the pH, the time cycles, the amount recycled, the amount of impurities contained in the phosphoric acid and other factors obvious and/or well known to one skilled in the art.

It is to be noted that the present invention is not to be confused with prior processes in which neutralization is accomplished by bringing the anhydrous ammonia and liquid phosphoric acid together in an agitator reaction vessel. In such prior processes, the neutralization occurs entirely in the liquid stage and the process at this neutralization stage is a one-step function. Due to too much thickening of the solids, limitations are likewise imposed on the concentration percentage of $P_2O_5$ in the acid. Such limitations are involved in the so-called "Missouri Farmer" and "TVA" process of the prior art.

It is to be noted that the present invention is not to be confused with prior art disclosing a variety of equipment including special rotary drums for the ammoniation. Such drums, for instance, have special construction including special inclinations and auxiliary equipment and having its length substantially equal to its diameter. In contrast thereto, the present rotary reactor or drum used herein has a length greater than its diameter. In practical operations, it is usually preferred to have an elongated drum having a length which is almost or about two times the size of the diameter of the drum or more. In practice, the present invention uses a reactor or drum which is horizontal and which is not inclined. No corrosion of the reactor or the sparger have been experienced. Sprays for acid are mounted over the bed and are all substantially the same size since a perfectly uniform distribution of acid is desired. No provision is made for the addition of water as it is neither desirable nor necessary when the present invention is carried into practice in the rotary reactor. A single horizontal ammonia sparger is used which introduces ammonia into the reactor in a direction perpendicular to the direction of rotation of the drum. Since the outlet parts or holes are all substantially the same size, a substantially uniform distribution of ammonia is obtained throughout the length of the sparger. In the present process, a large excess of ammonia is used and any ammonia not reacted with phosphoric acid in the bed is carried from the reactor with a current of air and is adsorbed in a recovery system. This recovery system utilizes a scrubber which is supplied with phosphoric acid to absorb and recapture ammonia and to partially neutralize the acid. The air carrying the ammonia to the recovery system must be carefully controlled and must not disturb the heat balance in the reactor. In the reactor, phosphoric acid and ammonia are distributed substantially uniformly over the entire active portion of the bed and the reaction to produce di-ammonium phosphate is very rapid and is accomplished by maintaining a high excess of ammonia (up to about 25% or so) which requires the use of a recovery system to recapture and absorb the excess of ammonia. While about 75% of the granular phosphate discharged from the reactor is preferably recycled for efficient commercial operation, nevertheless lower percentages of recycled feed may be used such as 66⅔% and even as low as 50%.

Although the present invention has been described in conjunction with preferred embodiments, it is to be understood that modifications and variations may be resorted to without departing from the spirit and scope of the invention as those skilled in the art will readily understand. While the invention has been described as being carried into practice with certain preferred equipment, it is to be understood that the invention is not limited thereto but may be carried into practice with any appropriate or suitable equipment. For instance, various grades or types of phosphates may be made by the improved method disclosed herein. The trade usually terms the product ammonium phosphate, although chemically the product is constituted of ammonium phosphates. Chemically speaking, ammonium phosphates are mixtures of mono-ammonium phosphate (12.17–61.70–0) $N-P_2O_5$ and di-ammonium phosphate (21.20–53.74–0) $N-P_2O_5$. When commercially pure phosphoric acid is used, a "commercially exact" analysis may be produced. on the other hand, when wet process phosphoric acid is used, a range of analyses will be produced. However, the individual granules will have essentially uniform composition. Moreover, the granules preferably have a range of sizes complying with or coming within the various screen analyses specified herein but other sizes may be resorted to which will comply with standards of the trade or requirements of farmers, fertilizer manufacturers, governmental agencies, farm associations or the like, or desires of those skilled in the art. Furthermore, phosphoric acid may be used containing various concentrations (percentages) of $P_2O_5$ and having various clarities and purities depending on the product to be made. Then again, a preferred method of utilizing excess ammonia has been disclosed hereinbefore but the excess of ammonia can be recovered in various ways, such as, for example, as aqueous ammonia, etc. Such modifications and variations are considered to be within the purview and scope of the invention and appended claims.

We claim:

1. A one-step continuous process for the production of granular high-analysis fertilizer having ammonium phosphate as its principal phosphatic component which comprises continuously introducing particles of fertilizer material together with fines of less than about 12-mesh size recycled from a later mentioned sizing step into the upper end of a horizontally rotating drum; continuously introducing impure phosphoric acid into the upper end of the drum; continuously introducing an ammoniating fluid into the upper end of the drum in quantity sufficient to neutralize the phosphoric acid to a degree such that proportions of monoammonium phosphate and diammonium phosphate are formed; maintaining a bed of rolling discrete particles in the drum; continuously withdrawing granular material from the lower end of the drum at a temperature in the range from about 140° F. to 212° F.; supplying substantially all of the heat for maintaing said temperature range from the heat of reaction of the reactants comprising phosphoric said and ammoniating fluid; maintaining moisture content of granular material leaving the drum in the range from about 1.0 percent to 8.0 percent; sizing the withdrawn granular material separating the fine portion thereof; separating a portion of product-size material; crushing the remaining portion of product-size material and all the over-size material; and recycling said crushed material together with said fine portion as fines to the rotating drum.

2. A one-step continuous process for the production of granular high-analysis fertilizer having ammonium phosphate as its principal phosphatic component which comprises continuously introducing a substantial portion of fines of less than about 12-mesh size of particles of granular fertilizer recycled from a later mentioned sizing step into the upper end of a horizontally rotating drum; continuously introducing impure phosphoric acid into the upper end of the drum; continuously introducing an ammoniating fluid into the upper end of the drum in quantity sufficient to neutralize the phosphoric acid to a degree such that ammonium phosphate comprising proportions of monoammonium phosphate and diammonium phosphate is formed; maintaining a bed of rolling discrete particles of granular fertilizer in the drum; continuously withdrawing granular fertilizer from the lower end of the drum at a temperature in the range from about 140° F. to 212° F.; supplying substantially all of the heat for maintaining said temperature range from the heat of reaction evolved in neutralizing phosphoric acid with ammoniating fluid; maintaining moisture content of granular fertilizer leaving the drum in the range from about 1.0 percent to 8.0 percent; sizing the withdrawn granular fertilizer; separating the fine portion thereof; separating a portion of product-size fertilizer; crushing the remaining portion of product-size fertilizer and all the over-size fertilizer; and recycling said crushed fertilizer together with said fine portion of said fertilizer as fines to the rotating drum.

3. A one-step continuous process for the production of granular high-analysis fertilizer having ammonium phosphates as its principal phosphatic component which comprises continuously introducing a substantial portion of fines recycled from a later mentioned sizing step into a bed in a substantially horizontally rotating drum; continuously introducing phosphoric acid into the upper end of said bed in the drum; continuously introducing ammonia into the bed in quantity sufficient to neutralize and to cause a reaction with phosphoric acid to a degree such that ammonium phosphates comprising monoammonium phosphate and diammnoium phosphate are formed together with heat of reaction; continuously rolling discrete particles of granular fertilizer forward in said bed from the upper end to the lower end of the drum; continuously withdrawing granular fertilizer from the lower end of the drum at a temperature in the range up to about 212° F.; supplying substantially all of the heat for maintaining said temperature from the said heat of reaction; maintaining moisture content of said granular fertilizer leaving the drum in the range from about 1.0% to about 8.0%; sizing the withdrawn granular fertilizer; separating the fine portion thereof; separating a portion of product-size fertilizer; crushing the remaining portion of product-size fertilizer and all the over-size fertilizer; and recycling said crushed fertilizer together with said fine portion as fines to the horizontally rotating drum.

4. A one-step continuous process of producing granular fertilizer having ammonium phosphate as its principal phosphatic component which comprises continuously feeding particles of granular ammonium phosphate constituted of recycled material from a later step into a substantially horizontally moving bed having an inlet and an outlet, said particles furnishing sufficient carrier and supply surfaces and furnishing nuclei for granulation of ammonium phosphate continuously covering surfaces of said particles with phosphoric acid; continuously bringing ammonia in contact with said particles of ammonium phosphate to neutralize phosphoric acid on the surfaces thereof and to produce newly-formed ammonium phosphate as an additional coating around said particles while evolving heat of neutralization; maintaining temperatures in said bed below the decomposition temperature of said ammonium phosphate and within a range up to about 212° F. with the aid of said heat of neutralization; continuously maintaining moisture content of granular ammonium phosphate leaving the outlet in the range from about 1.0% to about 8.0%; continuously withdrawing a mass of particles from the outlet of said bed containing the newly-formed ammonium phosphate; continuously separating a minor fraction of said mass to constitute finished product; and recycling a major fraction of said mass and returning it to the inlet of said bed.

5. A one-step continuous process of producing ammonium phosphate which comprises establishing a substantially horizontally moving bed of particles of ammonium phosphate; continuously feeding returned particles of ammonium phosphate from a later step into said bed; continuously distributing phosphoric acid over and on the particles in said bed; continuously diffusing ammonia within the particles in said bed to provide ammonia to neutralize phosphoric acid on said particles and to produce ammonium phosphate; continuously controlling said phosphoric acid and said ammonia to approximately stoichiometric proportions for said ammonium phosphate; continuously causing a current of air to move over the upper part of said bed to remove any steam, ammonia and other vapors evolved during the aforesaid neutralization; continuously maintaining temperatures in said bed below the decomposition temperature of said ammonium phosphate and within a range of about 140° F. to about 225° F.; continuously maintaining the moisture content of said ammonium phosphate from about 1.0% to about 8.0%; continuously controlling the pH in said bed from about 5.5 to about 8.5; continuously discharging a mass of particles of ammonium phosphate from said bed; continuously screening said discharged particles into oversize, fines and product size; continuously separating a portion of said product size as the finished product and the remainder for recirculation through the said bed; continuously grinding said over-size into a ground mass; and continuously returning said ground mass, said fines and said remainder for incorporation in said bed of particles of ammonium phosphate.

6. A one-step continuous process for the production of granular high-analysis fertilizer having ammonium phosphate as its principal phosphatic component which comprises establishing an elongated, substantially horizontally moving, solid bed of contacting granulated particles of ammonium phosphate having an inlet at one end and an outlet at the other end; continuously introducing a feed supply of finely-divided granules of ammonium phosphate recycled from a later mentioned step into the inlet end of said horizontally moving bed; continuously distributing phosphoric acid over and on said granules in said bed; continuously enveloping said granules with ammonia in amount sufficient to neutralize phosphoric acid on said granules and to cause formation of coatings of solid ammonium phosphate on the surface of said granules while continuously evaporating water at temperatures up to about 212° F.; continuously maintaining said temperatures with the aid of heat of neutralization; continuously imparting rotation and horizontal motion to the granules in said bed to cause said granules to roll over and over and contact adjacent granules and to move said granules horizontally forward from said inlet to said outlet of said bed thereby effecting mixing, granulating, rounding and drying of said granules; continuously withdrawing from the outlet of said bed a mass of directly produced, substantially dry, solid granules of ammonium phosphate; continuously recycling a major fraction of said mass of granules to provide a feed supply of ammonium phosphate to be introduced into the said inlet to maintain said bed; and continuously recovering a minor fraction of said withdrawn granules of ammonium phosphate as finished granular high-analysis fertilizer.

7. A one-step continuous process for the production of granular high-analysis fertilizer having ammonium phosphate as its principal phosphatic component which comprises continuously supplying finely-divided particles of ammonium phosphate constituting recycled feed from a later mentioned step into an elongated, substantially horizontally moving, solid bed of contacting particles of ammonium phosphate having a feed inlet at one end and a discharge outlet at the other end; continuously covering surfaces of said particles in said bed with phosphoric acid; continuously enveloping said phosphoric acid on the surfaces of said particles with ammonia to effect a neutralizing reaction to form ammonium phosphate; continuously controlling the amounts of said acid and said ammonia to at least stoichiometric proportions required for complete neutralization of phosphoric acid on said granules and formation of coatings of solid ammonium phosphate on the surfaces of said particles; continuously evaporating water from said particles in said bed at temperatures up to about 212° F. while continuously maintaining said temperatures in said bed with the aid of heat of reaction evolved from the neutralization of said phosphoric acid by said ammonia; continuously passing a stream of air above said bed to remove any evaporated water and other vapors evolved during the said neutralization; continuously rolling said particles over and over and contacting adjacent particles to cause rounding thereof while moving said particles horizontally forward from said feed inlet to said discharge outlet of said bed thereby effecting mixing, granulating, rounding and drying of said particles and the production of rounded granules; continuously withdrawing from said discharge outlet directly produced, substantially dry, rounded granules of ammonium phosphate; continuously recycling a major fraction of said rounded granules through the aforesaid operations to provide a feed supply of ammonium phosphate to be introduced into the feed inlet of said bed to maintain the same; continuously recovering a minor fraction of said withdrawn rounded granules as finished product; continuously cooling said finished product to liberate adsorbed and occluded ammonia carried by said granules; and continuously recovering said cooled granules of ammonium phosphate as the finished product capable of direct packing and direct piling and storage without deteriorating the material of the containers and without caking, setting-up or sticking together of the granules whereby substantially dry, high-analysis fertilizer is produced containing rounded granules of ammonium phosphate.

8. A one-step continuous process of producing ammonium phosphate as set forth in claim 5 in which the phosphoric acid continuously distributed over and on the particles in the bed is partially neutralized.

References Cited
UNITED STATES PATENTS

| | | | |
|---|---|---|---|
| 2,729,554 | 1/1956 | Nielsson | 71—43 |
| 2,600,253 | 6/1952 | Lutz | 71—64 |
| 2,926,079 | 2/1960 | Smith | 71—64 |
| 2,963,359 | 12/1960 | Moore et al. | 71—64 |
| 3,005,696 | 10/1961 | Hignett et al. | 71—43 X |
| 3,125,435 | 3/1964 | Alfrey et al. | 71—40 X |

S. LEON BASHORE, *Primary Examiner.*

MAURICE A. BRINDISI, ABRAHAM H. WINKELSTEIN, WILLIAM B. KNIGHT, ANTHONY SCIAMANNA, *Examiners.*